United States Patent
Bjornstad et al.

(10) Patent No.: US 11,212,233 B2
(45) Date of Patent: Dec. 28, 2021

(54) PACKET-BASED COMMUNICATION

(71) Applicant: TransPacket AS, Oslo (NO)

(72) Inventors: Steinar Bjornstad, Oslo (NO); Jan Petter Braute, Oslo (NO)

(73) Assignee: TransPacket AS, Oslo (NO)

( * ) Notice: Subject to any disclaimer, the term of this patent is extended or adjusted under 35 U.S.C. 154(b) by 162 days.

(21) Appl. No.: 16/630,266

(22) PCT Filed: Jun. 28, 2018

(86) PCT No.: PCT/GB2018/051810
§ 371 (c)(1),
(2) Date: Jan. 10, 2020

(87) PCT Pub. No.: WO2019/012246
PCT Pub. Date: Jan. 17, 2019

(65) Prior Publication Data
US 2021/0099395 A1    Apr. 1, 2021

(30) Foreign Application Priority Data
Jul. 13, 2017 (GB) ..................... 1711293

(51) Int. Cl.
*H04L 12/841* (2013.01)
*H04L 12/24* (2006.01)
(Continued)

(52) U.S. Cl.
CPC ........ *H04L 47/283* (2013.01); *H04L 41/0896* (2013.01); *H04L 47/2416* (2013.01); *H04L 47/30* (2013.01)

(58) Field of Classification Search
CPC ............... H04L 47/283; H04L 41/0896; H04L 47/2416; H04L 47/30; H04J 3/062; H04J 3/0632
See application file for complete search history.

(56) References Cited

U.S. PATENT DOCUMENTS

| 6,940,863 B2 | 9/2005 | Xue et al. |
| 7,379,466 B2 | 5/2008 | Kavaler |

(Continued)

FOREIGN PATENT DOCUMENTS

| WO | 2005/004363 | 1/2005 |
| WO | 2005/069561 | 7/2005 |
| WO | 2007/021199 | 2/2007 |

OTHER PUBLICATIONS

Bjornstad et al., "A Hybrid Packet/Time Slotted Circuit Switched Scheme (HPTS)", pp. 97-100, Jun. 2008.
(Continued)

*Primary Examiner* — Chandrahas B Patel
(74) *Attorney, Agent, or Firm* — Diederiks & Whitelaw, PLC.

(57) ABSTRACT

An apparatus for use in a packet-based communication system, comprises an input and an output. The apparatus is configured to receive a stream of data packets, having an inter-packet spacing, and store the received data packets and information representing the inter-packet spacing in a buffer, wherein the data packets are no longer than a common maximum data-packet length. The apparatus is further configured to schedule, at intervals, all the contents of the buffer except for a constant amount, into a respective container of a sequence of containers and, if the container then contains an incomplete data packet, schedule the remainder of the incomplete packet into the container. The apparatus is further configured to send the sequence of containers, wherein the positions of the data packets within the containers depend on the received inter-packet spacing, and wherein the constant amount is equal to or greater than the common maximum data-packet length.

20 Claims, 8 Drawing Sheets

(51) Int. Cl.
*H04L 12/853* (2013.01)
*H04L 12/835* (2013.01)

(56) References Cited

U.S. PATENT DOCUMENTS

| | | | | |
|---|---|---|---|---|
| 7,894,436 | B1* | 2/2011 | Bharghavan | H04L 47/10 370/392 |
| 8,031,728 | B2* | 10/2011 | Horvath | H04L 12/6418 370/412 |
| 8,165,021 | B2* | 4/2012 | Jogalekar | H04L 47/10 370/230 |
| 8,176,154 | B2* | 5/2012 | Minhazuddin | H04L 41/0816 709/223 |
| 9,596,072 | B2 | 3/2017 | Turnbull | |
| 9,967,638 | B2 | 5/2018 | Bjornstad et al. | |
| 10,541,937 | B2* | 1/2020 | Finn | H04L 45/64 |
| 2007/0223391 | A1 | 9/2007 | Kuroki et al. | |
| 2016/0044393 | A1* | 2/2016 | Graves | H04L 45/02 398/51 |

OTHER PUBLICATIONS

Bjornstad et al., "A Packet-Switched Hybrid Optical Network with Service Guarantees", IEEE Journal on Selected Areas in Communications, vol. 24, No. 8, pp. 97-107, Aug. 2006.

Breusegem et al., "Emulation of Overspill Routing in Optical Networks" ECOC 2005 Proceedings, vol. 2, pp. 271-272, Sep. 2005.

Breusegem et al., "Overspill Routing in Optical Networks: A True Hybrid Optical Network Design", IEEE Journal on Selected Areas in Communications, vol. 24, No. 4, pp. 13-25, Apr. 2006.

Chawla et al., "QoS Based Scheduling for Incorporating Variable Rate Coded Voice in BLUETOOTH", pp. 1-6.

Gauger et al., "Hybrid Optical Network Architectures: Bringing Packets and Circuits Together", IEEE Communications Maganize, pp. 36-42, Aug. 2006.

Girici et al., "Proportional Fair Scheduling Algorithm inOFDMA-Based Wireless Systems with QoS Constraints", Journal of Communications and Networks, vol. 12, No. 1, pp. 30-42, Feb. 2010.

Kismas et al., "Reservation Techniques in an OpMiGua Node", pp. 146-154.

Neely, "Delay-Based Network Utility Maximization", Proc. IEEE Infocom, pp. 1-9, Apr. 2010.

Nord et al., "OpMiGua Hybrid Circuit- and Packet-Switched Test-Bed Demonstration and Performance", IEEE Photonics Technology Letters, vol. 18, No. 24, pp. 2692-2694, Dec. 2006.

Puleio, "An Innovative Synchronzation Technique for OpMiGua-based Mobile Backhauls", Jul. 2010.

Sheeshia et al., "Synchronous Optical Burst Switching", Proceedings of the First International Conference on Broadband Networks, pp. 1-10.

Takenouchi et al., "40-Gb/s 32-bit Optical Packet Compressor-Decompressor Based on an Optoelectronic Memory", IEEE Photonics Technology Letters, vol. 16, No. 7, pp. 1751-1753, Jul. 2004.

Takenouchi et al., "40-Gbit/s 32-bit Optical Packet Compressor/Decompressor Based on a Photonic Memory", Optical Society of America, Jul. 2003.

* cited by examiner

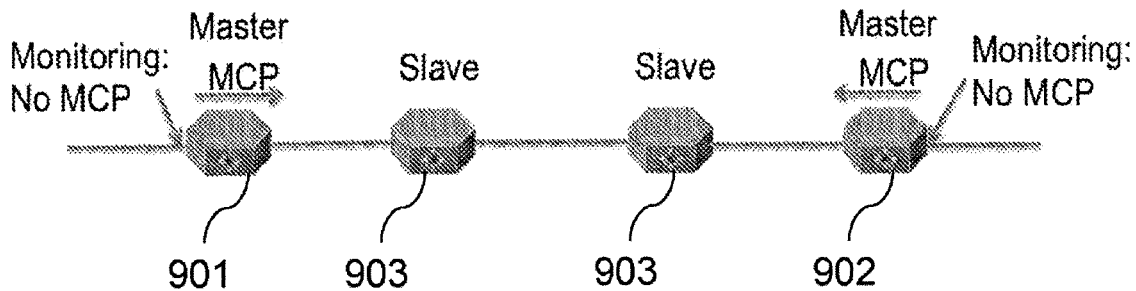
Figure 9
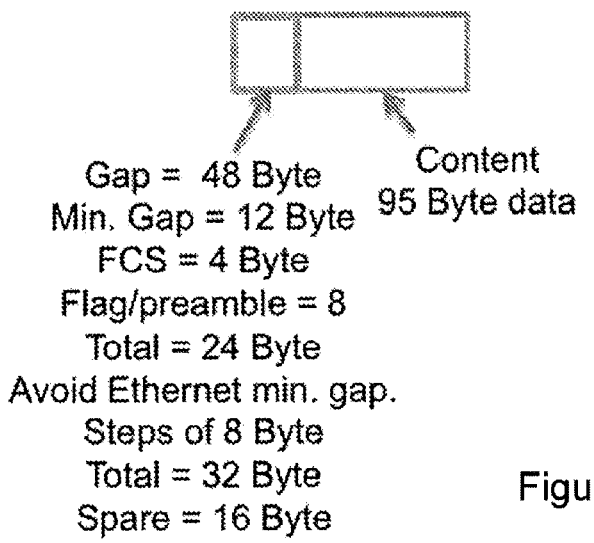
Figure 10
Gap = 48 Byte
Min. Gap = 12 Byte
FCS = 4 Byte
Flag/preamble = 8
Total = 24 Byte
Avoid Ethernet min. gap.
Steps of 8 Byte
Total = 32 Byte
Spare = 16 Byte
Content
95 Byte data
Figure 11

| Time of day | Client timestamp | Packet statistics | Byte statistics | Free running counter (timestamp) | CNOM (Nominal filling) | Csched (Actual filling) | |
|---|---|---|---|---|---|---|---|

Figure 12

Start of CCP time Synchronizes start of container

| Empty | Empty | Packet statistics | Byte statistics | Free running counter (timestamp) | CNOM (Nominal filling) | Csched (Actual filling) | Empty |
|---|---|---|---|---|---|---|---|

Figure 13

Start of CCP time Synchronizes start of container

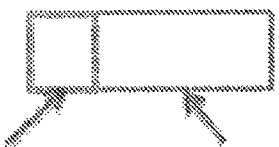

Gap = 32 Byte    Content
Min. Gap = 12 Byte 64 Byte data
FCS = 4 Byte
Flag/preamble = 8
Total = 24 Byte
Avoid Ethernet min. gap.
Steps of 8 Byte
Total = 32 Byte
Spare = 0 Byte

Figure 14

Incoming pattern with frequency f_in f_o < f_in: Gaps removed for correction f_o > f_in: Gaps added for correction

PACKET-BASED COMMUNICATION

CROSS-REFERENCE TO RELATED APPLICATIONS

This application represents the U.S. National Phase of International Application number PCT/GB2018/051810 entitled "Packet-Based Communications" filed 28 Jun. 2018, which claims benefit to Great Britain Application No. 1711293.9 filed 13 Jul. 2017, all of which are incorporated herein by reference.

BACKGROUND OF INVENTION

This invention relates to methods and apparatus for sending data in packet-based communication systems—especially, although not exclusively, with the aim of reducing packet delay variation.

Low latency has long been known to be an important parameter in data networks—especially telecom networks.

However, more recently the importance of minimising packet delay variation (PDV) has been emerging, as network operators have been moving from circuit-switched network to packet-switched networks. Mobile backhaul networks have demands for low latency, especially for technologies like the Long Term Evolution (LTE), but—even more importantly—they require the ability to transport synchronization information accurately. While SDH/SONET and OTN circuit networks offer fixed latency transport due to their static multiplexing nature, packet networks typically introduce packet delay variation through statistical multiplexing and buffering. While the information-loss (packet-loss) performance of packet networks can easily match circuit networks, the low latency variation of circuit networks has so far been hard to match. In IP packet networks, latency is generally non-deterministic because of unpredictable buffering in switches, and statistical variations in the traffic pattern.

FIG. 1 illustrates the difference between the static time-division multiplexing applied in circuit switching, and the statistical multiplexing applied in packet networks. In the circuit switching node on the left, traffic from three client interfaces can straightforwardly be aggregated on a single faster line, in defined time slots, with the performance of the individual circuits being independent of each other. In the packet switching node on the right, data packets from three client interfaces are buffered in the node, before being output on a single faster line. However, the latency and PDV of each client interface here depends on the overall load of the network, so the network can no longer offer the same deterministic transport to a client as is possible with circuit switched systems.

Peak packet delay variation has a direct impact on the latency at the transport and application layer, and so is an important parameter to minimize, especially when transmitting time-sensitive data such as live voice and video data, mobile backhaul/fronthaul data, and high-speed-financial-trading data. Mobile telephony networks commonly rely on wired network links between radio base stations in order to perform frequency and/or time synchronization of the base stations. When transporting synchronization information across a packet network—e.g., using IEEE 1588—ultra-low packet delay variation is required for achieving a high accuracy synchronization. In the IEEE 1914.3 standardization working group, radio over Ethernet is being standardized for mobile fronthaul applications. Both latency and latency variation are important to minimise in these various contexts.

Packet delay variation (PDV), also called packet jitter, is a measure on how much the latency of packets varies when they are transmitted through a node or a network of nodes. (A node here refers to any network component that receives and/or sends data over one or more network links, such as a network router or network switch, or an end-point device.)

PDV is a key parameter influencing the latency of a network at the transport and application layer. At the transport (e.g. TCP) layer and/or the application layer, typically all packets in a window or sequence (e.g., one video frame) are received before being played out. Hence, the peak PDV, given by the most-delayed packet, will contribute to the latency at this layer of the network. Latency at the application layer is the sum of minimum latency and the peak PDV. For a zero-packet-loss, real-time transfer, the peak PDV contributes strongly to the latency at the application layer. If packet-loss is tolerated, packets that are heavily delayed may be discarded in order to limit latency. In either case, PDV has a negative impact, causing either latency or packet loss (or both) at the application layer.

In fibre networks, the layer-1 transmission latency is given by the speed of light and the refraction index of the fibre, resulting in a fixed latency of approximately 5 microseconds/km of fibre. For long-range fibre transmission, the fibre is one of the main contributors to network latency. Optical network elements along the transmission path, like optical amplifiers, optical add/drop multiplexers, and transponders, typically each have less than one microsecond latency, hence do not contribute significantly to the latency compared with the fibre. All these latency sources typically add a fixed and predictable latency.

The situation is, however, quite different within electronic switches, and at the network layer. Looking at the contribution from the network layer, layer-2 Ethernet, and layer-3 IP, there are a number of sources contributing to latency and PDV. Furthermore, within network elements using electronics in the signal path, both latency and PDV are impacted by how the electronics and different building blocks of the electronics are implemented. PDV can, for example, be introduced: when buffering packets while doing processing and switching; when buffering packets for aggregating packets from several inputs onto one input; when handling packet bursts; when converting between clock domains; when data passes through a parallel to serial conversion in an electronic transceiver; and when there is frequency deviation between the clocks of different nodes in an asynchronous packet-switched network.

It will therefore be appreciated that there is a need for apparatus and methods that can reduce packet delay variation in packet-based communication systems and networks.

SUMMARY OF THE INVENTION

From a first aspect, the invention provides an apparatus for use in a packet-based communication system, the apparatus comprising an input and an output, and being configured to:

receive a stream of data packets, having an inter-packet spacing, at said input, wherein each of the data packets is no longer than a common maximum data-packet length;

store the received data packets and information representing the inter-packet spacing in a buffer; and schedule, at intervals, all the contents of the buffer, except for a constant amount, into a respective container of a sequence of containers and, if the container then contains an incomplete data packet, additionally schedule the remainder of the incomplete data packet, from the buffer, into the container; and send the received data packets from said output in said sequence of containers, wherein the positions of the data packets within the containers depend on the received inter-packet spacing, and wherein the constant amount is equal to or greater than the common maximum data-packet length.

From a further aspect, the invention provides a packet-based communication method, comprising:

receiving a stream of data packets, having an inter-packet spacing, wherein each of the data packets is no longer than a common maximum data-packet length;

storing the received data packets and information representing the inter-packet spacing in a buffer;

at intervals, scheduling all the contents of the buffer, except for a constant amount, into a respective container of a sequence of containers, and, if the container then contains an incomplete data packet, additionally scheduling the remainder of the incomplete data packet, from the buffer, into the container; and outputting the received data packets in said sequence of containers, wherein the positions of the data packets within the containers depend on the received inter-packet spacing, and wherein said constant amount is equal to or greater than the common maximum data-packet length.

Thus it will be seen by those skilled in the art that, in accordance with the invention, by positioning the data packets within the containers based on the received inter-packet spacing, the inter-packet spacing is preserved, so that the apparatus does not introduce packet delay variation in its processing of the packets. The apparatus may output each container at a higher line rate than a line rate at which the apparatus receives the stream of data packets. The use of containers allows a plurality of streams of data packets to share the output—e.g., by scheduling one container from each respective stream in turn, in a cycle. In some cases the output may have a higher line rate (e.g., 10 Gbps) than the input (e.g., 1 Gbps), although this is not essential.

The applicant has previously described the use of containers in its earlier patent application WO 2012/104623, the entire contents of which are hereby incorporated by reference. However, the present method for scheduling packets into containers is advantageous in that it avoids any potential for introducing packet delay or packet loss through the scheduling. This is achieved by the retaining of a constant amount, equal to or greater than the common maximum data-packet length, in the buffer during the first phase of scheduling, so that it is always possible to schedule the remainder of any incomplete data packet, in a second phase of scheduling, if an incomplete packet would otherwise be scheduled.

The sending of the data packets in containers preferably occurs at intervals. The sending intervals may correspond to the scheduling intervals. The apparatus may be configured to send one container before scheduling the next container in the sequence, etc., although this is not essential. Scheduling data may comprise determining, or fixing, a future time at which that data will be sent, or it may comprise actually sending the data (e.g., with negligible further delay).

The apparatus may be a single unit—e.g., having one housing—or it may comprise a plurality of distributed units. The apparatus may be a device. The apparatus may be any network component, such as a switch, a router, an Ethernet bridge, an add/drop unit, a computer server acting as virtual router or switch, etc. The input may be an optical input or an electrical input or a radio input. The output may be an optical output or an electrical output or a radio output. The apparatus may comprise a plurality of optical or electrical inputs and/or outputs. The apparatus may comprise any one or more of: processors, ASICs, FPGAs, volatile memory, non-volatile memory, electronic components, optical components, inputs, outputs, power supplies, etc. The apparatus may implement some or all of the steps described herein using software instructions executed by one or more processors, or using hardware (e.g., FPGA and/or ASICs), or using a combination of the two.

The apparatus may comprise one or more further inputs and may be configured to receive one or more respective further streams of data packets, each having a respective inter-packet spacing, at said one or more further inputs. Each of the data packets in each of the further streams may be no longer than a respective maximum data-packet length. The respective maximum data-packet lengths may all be the same, or may differ between the respective inputs. The apparatus may, for each input, store the received data packets and information representing the inter-packet spacing in a respective buffer. For each buffer, it may schedule, at intervals, all the contents of the buffer, except for a respective constant amount, into a respective container of a respective further sequence of containers and, if the container then contains an incomplete data packet, additionally schedule the remainder of the incomplete data packet, from the buffer, into the container. The constant amounts are preferably equal to or greater than the respective maximum data-packet lengths. As before, the positions of the data packets within the containers preferably depend on the received inter-packet spacing. The containers of the one or more further sequences of containers may be sent from said output, or from a further output. Containers of one or more of the sequences may be sent interleaved in time from said output. The apparatus may schedule one or more containers from each of the plurality of inputs in a cycle from said output.

In one set of embodiments, the apparatus is arranged to relay traffic between a network link having a first bit-rate and a plurality of network links having bit-rates lower than the first bit-rate. The apparatus may comprise a plurality of (e.g. ten) relatively low-line-rate (e.g. 1 Gbps) inputs and a relatively high-line-rate (e.g. 10 Gbps) output.

The inter-packet spacing in the stream of received data packets may be represented by gaps of no data, or by one or more predetermined gap bytes—e.g., a special value that encodes a gap. The apparatus is preferably arranged to receive the stream of data packets asynchronously at the packet level—i.e., without knowing precisely when each packet will arrive. The input may be synchronous at the bit level, or it may be asynchronous at the bit level.

The (or each) buffer is preferably stored in an electronic memory of the apparatus, such as RAM. It preferably comprises a first-in first-out (FIFO) buffer.

The (or each) common maximum data-packet length may be a predetermined maximum data-packet length. It may equal a maximum transmission unit (MTU) for the input, or for a network link connected to the input, or a network of which the apparatus forms part.

The containers of the sequence of containers may have variable lengths, but preferably all have a common length. This can simplify the scheduling of the containers, especially where the apparatus is aggregating a plurality of streams at the output. Where multiple sequences are sent from the output, the containers may all have a common length across the sequences, or they may have different lengths between the sequences.

If the apparatus receives gap bytes at the input, the positions of the data packets within the containers may depend on the received inter-packet spacing simply by the apparatus including the received gap bytes in the buffer with the data packets. The apparatus may then include the same gap bytes and data bytes in a container, in the same order in which it received them. If, however, the input is silent between data packets, the apparatus may time each gap between successive data packets and leave corresponding gaps between the successive data packets in the container. The gaps in the container may be scaled (e.g., linearly) relative to the received gaps if the output line rate is different from the input line rate. The inter-packet spacing may be represented in the buffer by storing values representing the gap times. Alternatively, if the output requires gap bytes, but these are not present on the input, the apparatus may insert an appropriate number of gap bytes between successive data packets in the containers, corresponding to the timing of the gaps at the input.

The containers may take any suitable form. Each container preferably occupies a contiguous block of time (or bits). At its broadest, a container may simply be a contiguous block of time (or bits), over a network link, whose start (and preferably end) is identifiable to a receiving apparatus. Unlike the use of fixed time-slots in a fully-synchronous network (e.g., circuit switched), a receiving apparatus need not know precisely when any particular container will arrive. Nevertheless, containers may be sent in a predetermined order—e.g., cycling round a plurality of inputs to the apparatus, with each cycle containing a predetermined number of containers associated with each input (which may vary between inputs). The apparatus may include a container control packet in each container—e.g., at the beginning of each container. A receiving apparatus may use the container control packet to detect the arrival of a new container. The container control packet may encode data relating to the container or in a preceding container (such as an immediately-preceding container). In particular, the apparatus may communicate the aggregate length of data and inter-packet spacing in a container in a container control packet, as is described in more detail below. In some embodiments, a container control packet may encode the length of data and inter-packet spacing that was scheduling in the container before any additional scheduling of an incomplete data packet; in some situations, this value may be more straightforward to include than the actual amount scheduled, and it can still enable a receiving apparatus to determine the full amount of data and inter-packet spacing that was scheduled. The aggregate length of data and inter-packet spacing in a container may represent a filling level for the container. The container may also contain one or more additional gaps or voids, such as at the end of the container. This will typically be the case where, as in some embodiments, the containers all have a common length. More generally, the apparatus may communicate the aggregate length of data and inter-packet spacing in a container to a receiving apparatus using any channel, not necessarily using a container control packet (e.g., via a separate data link).

Although this aspect of the invention provides a way to reduce or prevent packet loss and/or packet delay variation (PDV) caused by the operation of the apparatus itself, it is still possible that one or more network components downstream of the apparatus might introduce packet delay variation before the containers are received by an intended receiving apparatus. This PDV could be manifested by a reduction or expansion in the size of one or more gaps in a container. In situations where a gap is encoded in a container by means of one or more gap bytes, this PDV would correspond to a reduction or increase in the number of gap bytes in one or more gaps in the container.

The applicant has realised that this problem can be mitigated by providing receiving apparatus that is arranged to adjust the inter-packet spacing within a received container so that the aggregate length of data and inter-packet spacing within the received container corresponds to the aggregate length of data and inter-packet spacing that was contained within the container when it was transmitted by the transmitting apparatus.

This idea is believed to be novel and inventive in its own right and thus, from a further aspect, the invention provides a packet-based communication system comprising a transmitting apparatus, a receiving apparatus and a communications link between the transmitting apparatus and the receiving apparatus, wherein the transmitting apparatus comprises an input and an output, and is configured to:
  receive data packets, having an inter-packet spacing, at said input; and
  send the data packets to the receiving apparatus from said output, over the communications link, in a sequence of containers, wherein the positions of the data packets within the containers depend on the received inter-packet spacing, and wherein each transmitted container contains a respective aggregate length of data and inter-packet spacing, and wherein the receiving apparatus comprises an input and an output, and is configured to:
  receive the sequence of containers at said input;
  determine whether the aggregate length of data and inter-packet spacing within each received container corresponds to the aggregate length of data and inter-packet spacing that was contained within the container when it was transmitted by the transmitting apparatus, and, when this determination is false, adjust the inter-packet spacing within the received container so that the aggregate length of data and inter-packet spacing within the received container corresponds to the aggregate length of data and inter-packet spacing that was contained within the container when it was transmitted by the transmitting apparatus; and
  send, from said output, data packets from the received containers at times that depend on the adjusted inter-packet spacing.

From another aspect, the invention provides a receiving apparatus comprising an input and an output, configured to:
  receive a sequence of containers at said input, from a transmitting apparatus, wherein each container contains one or more data packets, and has a respective received aggregate length of data and inter-packet spacing;
  determine whether the received aggregate length of data and inter-packet spacing within each received container corresponds to an aggregate length of data and inter-packet spacing that was contained within the container when it was transmitted by the transmitting apparatus, and, when this determination is false, adjust the inter-packet spacing within the received container so that the aggregate length of data and inter-packet spacing within the received container corresponds to the aggregate length of data and inter-packet spacing that was contained within the container when it was transmitted by the transmitting apparatus; and send, from said output, data packets from the received containers at times that depend on the adjusted inter-packet spacing.

From another aspect, the invention provides a packet-based communication method, comprising:

receiving a sequence of containers from a transmitting apparatus, wherein each container contains one or more data packets, and has a respective received aggregate length of data and inter-packet spacing;

determining whether the received aggregate length of data and inter-packet spacing within each received container corresponds to an aggregate length of data and inter-packet spacing that was contained within the container when it was transmitted by the transmitting apparatus, and, when this determination is false, adjusting the inter-packet spacing within the received container so that the aggregate length of data and inter-packet spacing within the received container corresponds to the aggregate length of data and inter-packet spacing that was contained within the container when it was transmitted by the transmitting apparatus; and outputting data packets from the received containers at times that depend on the adjusted inter-packet spacing.

By adjusting the inter-packet spacing before outputting the data packets, the receiving apparatus is able to compensate for some or all of the PDV that may have been introduced by the communications link between the transmitting apparatus and the receiving apparatus. The adjusting may be done in a memory of the receiving apparatus (e.g., by moving data in a buffer), or it may be done on-the-fly as the apparatus schedules or outputs the data packets from an output.

The transmitting apparatus may be the apparatus of the former aspects, or may have any feature of any embodiments thereof.

It will be appreciated that the terms "transmitting apparatus" and "receiving apparatus" are used for ease of reference only, because the transmitting apparatus also comprises an input for receiving data, and the receiving apparatus also comprises an output for transmitting data. One apparatus may embody a transmitting apparatus according to any aspect or embodiment disclosed herein and also embody a receiving apparatus according to any aspect or embodiment disclosed herein. Essential or optional features of any aspect or embodiment disclosed herein may, wherever appropriate, be taken as features of any other aspect or embodiment disclosed herein.

There are various ways in which the receiving apparatus may determine whether the aggregate length of data and inter-packet spacing within each received container corresponds to the aggregate length of data and inter-packet spacing that was contained within the container when it was transmitted by the transmitting apparatus. Some of these approaches are described below, although any appropriate mechanism may be used.

In one set of embodiments, the transmitting apparatus is arranged to communicate to the receiving apparatus said respective aggregate length of data and inter-packet spacing. It may do this by transmitting data representing the aggregate length.

Thus, from another aspect, the invention provides a transmitting apparatus comprising an input and an output, configured to:

receive data packets, having an inter-packet spacing, at said input;

send the data packets from said output in a sequence of containers, to a receiving apparatus, wherein the positions of the data packets within the containers depend on the received inter-packet spacing, and wherein each container contains a respective aggregate length of data and inter-packet spacing; and send to the receiving apparatus data representing said respective aggregate length of data and inter-packet spacing, for each container.

From another aspect, the invention provides a packet-based communication method, comprising:

receiving data packets, having an inter-packet spacing;

outputting the data packets in a sequence of containers, to a receiving apparatus, wherein the positions of the data packets within the containers depend on the received inter-packet spacing, and wherein each container contains a respective aggregate length of data and inter-packet spacing; and outputting data representing said respective aggregate length of data and inter-packet spacing, for each container.

The data may represent the aggregate length in any appropriate way—i.e., in any way that allows the receiving apparatus to determine the aggregate length. The data may encode a value equalling or representing the aggregate length, or from which the receiving apparatus may derive the aggregate length.

In some embodiments, in which the transmitting apparatus schedules, at intervals, all the contents of a buffer, except for a constant amount, into a respective container of a sequence of containers and, if the container then contains an incomplete data packet, additionally schedules the remainder of the incomplete data packet, as described above, the data may encode the size of the contents of the buffer, minus said constant amount—i.e., disregarding any additional scheduling of an incomplete data packet that might have been needed. The receiving apparatus may nevertheless still determine the aggregate level of data and gaps in the container (including the complete final data packet) from this information. It may do so by detecting that there is a data packet extending beyond the communicated size within the container, finding the end of this last data packet, and then calculating the aggregate length of data and inter-packet spacing for the container based on the communicated size plus the additional portion of the last data packet that extended beyond the communicated size.

The data representing said respective aggregate length may be communicated in a container control packet contained in the container to which the data relates. Alternatively, the data may be communicated in a container control packet contained in a different container from the container to which the data relates—e.g., it may be communicated in a later container, such as an immediately following container associated with the same input. This may enable the transmitting apparatus to output the data faster by not needing to delay transmission of the container up while it encodes the container control packet.

In one set of embodiments of any preceding aspect, the receiving apparatus is arranged to adjust the inter-packet spacing for a received container by determining the number of inter-packet gaps in the container and using this number to identify one or more positions in the container at which to increase or reduce the inter-packet spacing.

The transmitting apparatus may be arranged to communicate the number of inter-packet gaps in each container to the receiving apparatus. Alternatively, the receiving apparatus may detect or count the gaps by analysing each received container—e.g., by looking for the presence of a special gap byte, or for spaces that do not contain packet data.

Thus, from a further aspect, the invention provides a packet-based communication system comprising a transmitting apparatus, a receiving apparatus and a communications link between the transmitting apparatus and the receiving apparatus, wherein the transmitting apparatus comprises an input and an output, and is configured to:

receive data packets, having an inter-packet spacing, at said input;

send the data packets to the receiving apparatus from said output, over the communications link, in a sequence of containers, wherein the positions of the data packets within the containers depend on the inter-packet spacing of the data packets, and wherein each transmitted container contains a respective aggregate length of data and inter-packet spacing, and wherein the receiving apparatus comprises an input and an output, and is configured to:

receive the sequence of containers at said input;

adjust, where required, the inter-packet spacing within each container so that an aggregate length of the data packets and inter-packet spacing within the received container corresponds to the aggregate length of the data packets and inter-packet spacing that was contained within the container when it was transmitted by the transmitting apparatus, wherein said adjusting comprises determining the number of inter-packet gaps in the container and using this number to identify one or more positions in the container at which to increase or reduce the inter-packet spacing; and send, from said output, data packets from the received containers at times that depend on the adjusted inter-packet spacing.

From another aspect, the invention provides a receiving apparatus comprising an input and an output, configured to:

receive a sequence of containers at said input, from a transmitting apparatus, wherein each container contains one or more data packets, and has a respective received aggregate length of data and inter-packet spacing;

adjust, where required, the inter-packet spacing within each container so that the received aggregate length of the data packets and inter-packet spacing within the received container corresponds to the aggregate length of the data packets and inter-packet spacing that was contained within the container when it was transmitted by the transmitting apparatus, wherein said adjusting comprises determining the number of inter-packet gaps in the container and using this number to identify one or more positions in the container at which to increase or reduce the inter-packet spacing; and send, from said output, data packets from the received containers at times that depend on the adjusted inter-packet spacing.

The receiving apparatus may determine the number of inter-packet gaps from data transmitted to the receiving apparatus by the transmitting apparatus—e.g., encoded in a container control packet—or it may be arranged to count the inter-packet gaps in each received container.

The receiving apparatus may be arranged to determine a total amount of inter-packet spacing to be added to or removed from a container. It may divide the total amount by the number of gaps, and add or remove an equal amount to or from each gap (subject to rounding). In other words, the receiving apparatus may be arranged to add or remove this total amount by adding or removing a respective amount from each gap in the container, wherein the respective amounts differ from each other by at most one unit of additional or removal, and wherein the respective amounts sum to the total amount. A unit of additional or removal may be a byte, or a bit, or any other appropriate measure of data length and/or time.

In another set of embodiments, the receiving apparatus may be arranged to add or remove a total amount of inter-packet spacing by adding or removing respective amounts, summing to the total amount, from a set of gaps in the container, wherein the gaps in the set of gaps are selected according to a random or pseudo-random process. The number of gaps may be an input to the selection process.

It will be appreciated that the term "inter-packet spacing", when used in the context of a container, may refer not only to gaps between packets, but also to any gap at the beginning of a container and/or to any gap at the end of a container, or at the end of a filled length of the container.

By distributing adjustments over multiple gaps within a container, where possible, rather than simply applying the entire adjustment at just one position in the container (e.g., to the first gap), the PDV of each packet in the container can be expected to be corrected more accurately, on average.

In embodiments of any aspect herein, the receiving apparatus may be arranged to determine respective lengths of one or some or all of the inter-packet gaps in a received container. It may use the respective lengths to identify one or more positions in the container at which to increase or reduce the inter-packet spacing. The transmitting apparatus may transmit data encoding the lengths of the inter-packet gaps in each container, or the receiving apparatus may determine the lengths by analysing a received container.

The receiving apparatus may be configured, when adjusting the inter-packet spacing within a container in order to shorten the container, to determine the lengths of every data packet in the container. The receiving apparatus may be configured to use these lengths when identifying the one or more positions in the container at which to reduce the inter-packet spacing by using the lengths in an algorithm that identifies the one or more positions such that the expected reduction to an inter-packet space immediately preceding a data packet having a first length is greater than the expected reduction to an inter-packet space immediately preceding a data packet having a second, shorter length. This can result in better correction of PDV because, in some networks, longer packets may be more likely to experience greater delays than shorter packets.

In any embodiments disclosed herein, the transmitting apparatus may be configured to communicate to the receiving apparatus the position of the first data packet within each container. The receiving apparatus may be configured to move the first data packet of any received container for which the first data packet is not at the communicated position within the container by increasing or reducing the inter-packet spacing immediately preceding the first data packet by an amount that causes the first data packet to move to the communicated position within the container.

The transmitting apparatus may be configured to communicate to the receiving apparatus the position of the last data packet within each container. The receiving apparatus may be configured to move the last data packet of any received container for which the last data packet is not at the communicated position within the container by changing the inter-packet spacing within the container so as to cause the last data packet to move to the communicated position within the container.

The transmitting apparatus may be configured to communicate to the receiving apparatus the respective position of each data packet within each container. The receiving apparatus may be configured to move any data packet in a received container that is not at the communicated respective position by changing the inter-packet spacing within the container so as to cause the data packet to move to the communicated position within the container.

In one set of embodiments, the transmitting apparatus according to any aspect herein may be arranged to transmit containers, from one or more sequences of containers, at regular transmission time intervals. The receiving apparatus according to any aspect herein may be arranged to measure one or more time intervals at which the receiving apparatus receives the containers. The receiving apparatus may be arranged to determine whether the aggregate length of data and inter-packet spacing within each received container corresponds to the aggregate length of data and inter-packet spacing that was contained within the container when it was transmitted by the transmitting apparatus by determining whether there is a difference between the measured one or more time intervals and the regular transmission time intervals. The receiving apparatus may further use the measured one or more time intervals when adjusting the inter-packet spacing within the received container.

Thus, from a further aspect, the invention provides a packet-based communication system comprising a transmitting apparatus and a receiving apparatus, wherein the transmitting apparatus is configured to:

receive data packets, having an inter-packet spacing;

send the data packets to the receiving apparatus, over a communications link, in a sequence of containers having respective transmission lengths, wherein the positions of the data packets within the containers depend on the inter-packet spacing of the data packets, wherein the start of each container is marked by a respective container-start packet generated by the transmitting apparatus, and wherein the container-start packets are transmitted at regular intervals, and wherein the receiving apparatus is configured to:

receive the sequence of containers, each container having a received length which may differ from the transmission length of that container;

use the intervals between the received container-start packets to adjust the lengths of any received containers whose received length does not correspond to the transmission length of the container, by adjusting the inter-packet spacing within each such container, so that the received length of each container corresponds to the transmission length of that container; and output the data packets from the received containers at times that depend on the adjusted inter-packet spacing.

The container-start packets may be container control packets, as described elsewhere herein.

The containers may be contiguous—i.e., the regular intervals may equal the transmission lengths of the containers (including the container-start packets). In this case, every container will have a common transmission length.

The receiving apparatus may adjust the lengths of the received containers so that the intervals between the received container-start packets, after adjustment, equal the regular intervals of the transmission (subject to any frequency compensation that may be implemented to account for different clock speeds between the transmitting apparatus and the receiving apparatus). In this way, PDV is reduced.

The adjustment of the inter-packet spacing may be applied at one or multiple positions within a container, as described elsewhere herein.

In embodiments of this aspect, the transmitting apparatus may be configured to communicate to the receiving apparatus, for each container, the aggregate length of the received data packets and inter-packet spacing contained within the container. The receiving apparatus may be configured to check each adjusted container to determine whether the adjusted container contains a data packet that extends beyond the communicated aggregate length from the start of the container and, if so, to reduce the inter-packet spacing within the container so as to move that data packet nearer to the start of the container such that it no longer extends beyond the communicated aggregate length from the start of the container. It may do this before outputting the data packets at times that depend on the reduced inter-packet spacing.

In embodiments of any aspect disclosed herein, the transmitting apparatus may send time stamps to the receiving apparatus—e.g., a respective transmission time-stamp for some or every container. Time stamps may be encoded in container control packets. The receiving apparatus may be arranged to use the time stamps to perform a frequency compensation operation. This can be used to compensate for differences in frequency of a clock in the transmission apparatus and a clock in the receiving apparatus. The receiving apparatus may apply frequency compensation by adding or removing gaps from inter-packet spacing before outputting the data packets. This frequency compensation may be applied in combination with one or more of the other PDV-reducing techniques disclosed herein. The receiving apparatus may apply a filtering operation to the received time stamps, or may consider two or more time stamps separated in time by multiple containers, when performing a frequency compensation; in this way short-term differences due to PDV can be filtered, in order to determine an underlying difference in clock frequencies.

A receiving apparatus may be configured to output the data packets with all inter-packet spacing removed if a fault condition is met, such as if a buffer in the receiving apparatus exceeds a threshold filling level. While this is likely to result in worsened PDV, it may avoid packet loss, and therefore be preferable in some situations.

In embodiments of any aspect disclosed herein, the receiving apparatus may be arranged to receive, from a transmitting apparatus, data representing the number of data packets within each container sent by the transmitting apparatus to the receiving apparatus. The receiving apparatus may determine, for each received container, whether the received container contains the communicated number of data packets within a transmission length of the container, and, if it does not, may receive one or more additional data packets extending beyond the end of the container, until the communicated number of data packets has been received. The receiving apparatus may include the additional one or more data packets in the received container by reducing the inter-packet spacing within the container so as to make space for the additional one or more data packets. The inter-packet spacing may be reduced using any of the techniques described herein. The receiving apparatus may thus comprise a receive buffer that is larger than the expected transmission length of the container, in order to receive data that may have been spread out in time when passing through the network path.

Thus, from a further aspect, the invention provides a packet-based communication system comprising a transmitting apparatus and a receiving apparatus,
wherein the transmitting apparatus is configured to:
receive data packets, having an inter-packet spacing;
send the data packets to the receiving apparatus, over a communications link in containers, wherein the positions of the data packets within the containers depend on the inter-packet spacing of the data packets, wherein the containers have a uniform transmission length, and wherein each transmitted container contains data packets and inter-packet spacing having a respective aggregate length;
communicate to the receiving apparatus the number of data packets within each container, and
wherein the receiving apparatus is configured to:
receive the sequence of containers;
determine, for each received container, whether the received container contains the communicated number of data packets within the transmission length of the container, and, if it does not, receive one or more additional data packets extending beyond the end of the container, until the communicated number of data packets has been received, and include the additional one or more data packets in the received container by reducing the inter-packet spacing within the container so as to make space for the additional one or more data packets; and
output the data packets from the received containers at times that depend on the adjusted inter-packet spacing.

In embodiments of any aspect disclosed herein, the transmitting apparatus may output containers of different size—e.g., outputting interleaved sequences of containers having different respective fixed container lengths for different respective input data streams. This may be appropriate if the different input data streams have different maximum transmission units (MTU).

Thus, from a further aspect, the invention provides an apparatus for use in a packet-based communication system, the apparatus comprising a first input, a second input, and an output, and being configured to:
receive a first stream of data packets, having a first maximum packet length, and having an inter-packet spacing, at the first input at a first line rate;
receive a second stream of data packets, having a second maximum packet length, greater than the first maximum packet length, and having an inter-packet spacing, at the second input at a second line rate;
send the first stream of data packets from the output, at a third line rate, higher than the first and second line rates, in a first sequence of containers, wherein the containers of the first sequence have a first uniform transmission length, and wherein the positions of the data packets of the first stream of data packets within the containers depend on the inter-packet spacing of the first stream of data packets; and
send the second stream of data packets from the output, at the third line rate, in a second sequence of containers, interspersed between the first sequence of containers, wherein the containers of the second sequence have a second uniform transmission length, greater than the first uniform transmission length, and wherein the positions of the data packets of the second stream of data packets within the containers depend on the inter-packet spacing of the second stream of data packets.

The second line rate may be higher than first line rate. A ratio of the second line rate to the first line rate may equal a ratio of the second maximum packet length to the first maximum packet length. Containers from the first and second sequences may be sent alternately from the output. However, this is not essential, and a plurality of containers from one of the first and second sequences may be sent for every one container of the other of the first and second sequences, or for every different plurality of containers of the other of the first and second sequences. The first and second sequences may be sent in a cycle with a first number of containers from the first sequence, and a second number of containers from the second sequence, being scheduled in each cycle. The first number may be different from the second number. This can allow a higher bitrate to be served to one of the inputs than the other, or can allow the first stream to have the same bitrate as the second stream, despite using smaller containers. The first and second numbers are preferably fixed across a plurality of cycles.

In any embodiments disclosed herein, the transmitting apparatus and/or receiving apparatus may have an output that operates at a higher or a lower bitrate than an input. However, in some embodiments, the output may have the same bitrate as the input—e.g., the apparatus may be, or comprise, a regenerator.

From a further aspect the invention provides a packet-based communication network comprising any one or more of: a packet-based communication system as disclosed herein; a transmitting apparatus as disclosed herein; and/or a receiving apparatus as disclosed herein. The network may comprise one or more networks links. The network may be a wired network, an optical network, a radio network, a microwave network, an acoustic network, or any other kind of network. The network may be part of, or connected to, a mobile telecommunications transport network, such as a backhaul or front-haul network. The network may be, or may form part of, a network within a car or other vehicle, or an industrial network e.g. for controlling robotics.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

FIG. 9 is a schematic diagram of nodes transmitting master control packets;

FIG. 10 is a schematic diagram of data fields in a master control packet;

FIG. 11 is a schematic diagram of data fields in a master control packet for use in an Ethernet network;

FIG. 12 is a schematic diagram of data fields in a container control packet;

FIG. 13 is a schematic diagram of data fields in a different container control packet;

FIG. 14 is a schematic diagram of data fields in a container control packet for use in an Ethernet network;

DETAILED DESCRIPTION OF THE PREFERRED EMBODIMENTS

The applicant's earlier patent application WO 2012/104623 described two service types for traffic in a switched network. It describes a first service type named Guaranteed Service Transmission (GST) which is intended for data that requires minimal latency and packet delay variation (PDV). Data packets sent over this service are named GST packets. WO 2012/104623 also describes a method for assembling a number of GST packets in a data container. A second service type, called Statistically Multiplexed (SM), is intended for data flows that can tolerate some PDV and some packet loss.

The embodiments described below implement various different mechanisms for minimising or avoiding packet delay variation (PDV) in data streams—especially those containing GST packets.

IETF RFC 5481 defines the terms inter-packet delay variation (IPDV) and packet delay variation (PDV). These can be summarised as follows.

Let $D_i$ denote the one-way delay of the i-th packet of a stream of packets indexed by i=1, 2, 3, . . . within a test interval. A one-way delay for is the difference between the transmission time, $T_i$, of the packet at one end of a network path, and the reception time, $R_i$, of the packet at the other end of the network path. The IPDV is then defined as $IPDV_i = D_i - D_{i-1}$. From the following, it be seen that IPDV also represents the change in inter-packet spacing between transmission and reception:

$$IPDV_i = D_i - D_{i-1} = (R_i - T_i) - (R_{i-1} - T_{i-1}) = (R_i - R_{i-1}) - (T_i - T_{i-1}).$$

The mean $IPDV_i$ over all i for a stream is usually zero. However, a slow delay change over the life of the stream, or a frequency error between the measurement system clocks, can result in a non-zero mean.

PDV, according to RFC 5481, is given as $PDV_i = D_i - D_{min}$ where $D_{min}$ is the delay of the packet having the lowest value for delay over the test interval. Values of PDV may be zero or positive, and quantiles of the PDV distribution are direct indications of delay variation. PDV is a version of the one-way-delay distribution, shifted to the origin by normalizing to the minimum delay.

However, the term "packet delay variation" (PDV) is used herein in a generally broader sense, encompassing both inter-packet delay variation (IPDV) and packet delay variation (PDV), as these terms are defined in RFC 5481.

An aggregation and de-aggregation mechanism will now be described, having the purpose of avoiding PDV. The method can aggregate multiple GST packet streams, while preserving the interpacket spacing (i.e., the durations of the gaps) between the GST packets in each stream.

Figure 1:
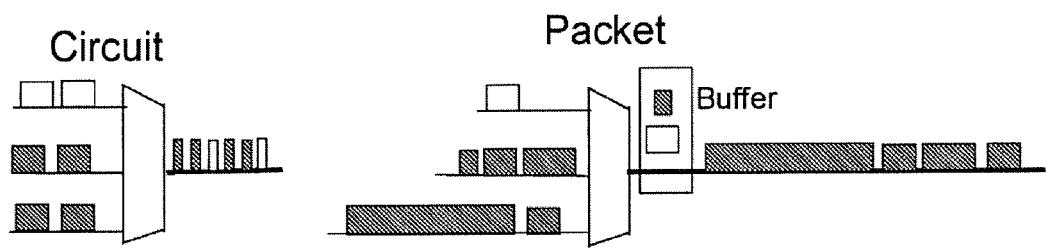
FIG. 1 is a schematic diagram of a circuit-switched node and a packet-switched node, according to the prior art.
Figure 2:
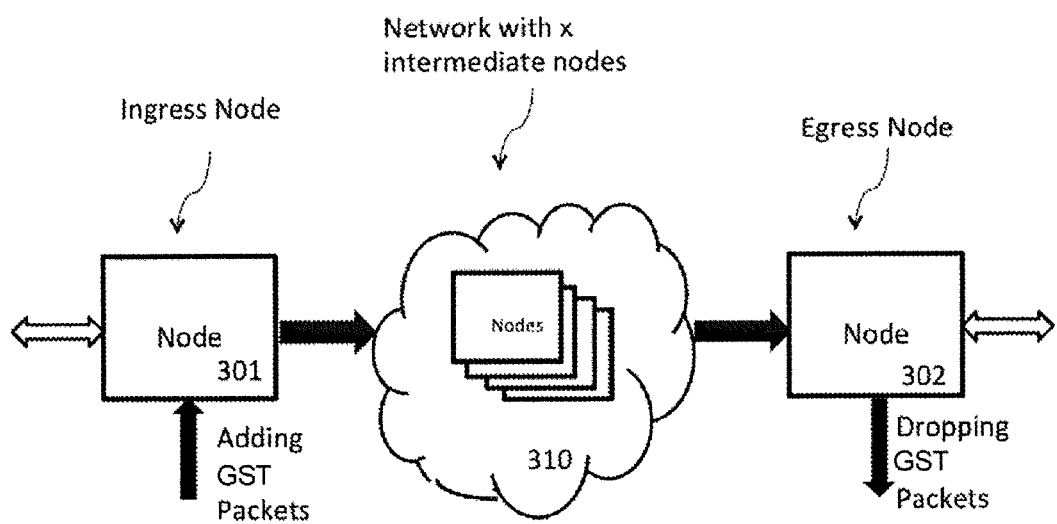
FIG. 2 is a schematic diagram of a portion of a network having nodes embodying the invention.

FIG. 2 shows part of an asynchronous network that includes an ingress node 301 (transmitting node) and an egress node 302 (receiving node). On the path between these nodes 301, 302 are a set of one or more intermediate nodes 310.

Each node can have zero or more client interfaces (e.g., ten one-Gbps, bi-directional client interfaces) and one or more line interfaces (e.g., two ten-Gbps, bi-directional line interfaces). Each of the line interfaces might typically be connected via a link to another similar node—for example to form a ring topology spanning a town or city. Each of the slower, client interfaces might typically be connected to a company network, or to a Digital Subscriber Line Access Multiplexer (DSLAM) belonging to a residential Internet Service Provider (ISP).

A node may aggregate incoming data from two or more client interfaces onto one line output by placing data packets (and interpacket gaps) from each client interface into a respective stream of containers. Containers from the different client interfaces can be interleaved on the line output, because the line output supports a higher bit-rate than the client interfaces. Container from the respective client interfaces may be sent in cycles, with a respective predetermined number of containers from each interface being included in each cycle (e.g., one container for each interface, or different numbers of container for different interfaces if one interface requires a higher bandwidth than another interface).

The intermediate nodes 310 can let GST containers pass through them, and they may also be able to add or drop GST containers. Within the intermediate nodes 310 the GST containers may be regenerated with respect to PDV, using the techniques described below. Each GST stream may be assigned its own wavelength, or may have its own time-slot. Scheduling GST packets in predefined time-slots enables the ingress node 301 to aggregate one or more lower-bit-rate GST streams into a higher bit-rate GST-stream, which passes through the intermediate nodes 310, while introducing minimal or zero packet-delay variation (PDV).

Figure 3:
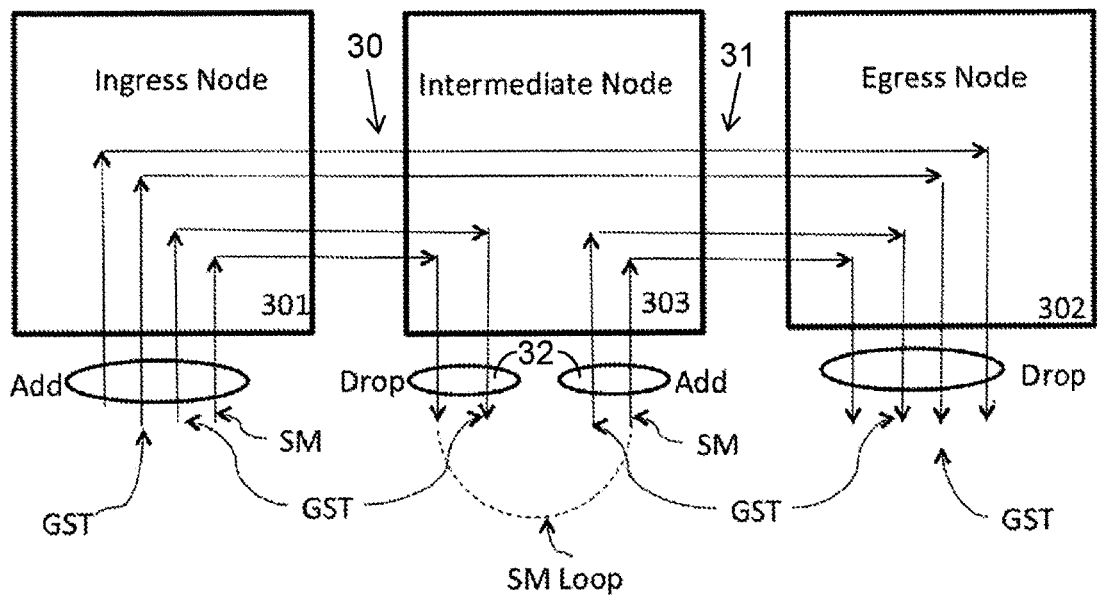
FIG. 3 is a schematic diagram of three nodes embodying the invention.

FIG. 3 shows, in more detail, a particular intermediate add/drop node 303 from the set of intermediate nodes 310. GST containers can be added, dropped or passed through the node 303 as required. When being passed through the node 303—i.e., when travelling from the ingress node 301 to the egress node 302—the incoming bitrate of the stream and input interface 30 may be equal to the outgoing bitrate of the output interface 31 and stream.

The aggregation and de-aggregation method is realized using downscaling and upscaling of both the gaps between the GST packets and the durations of the packets that enter the client interfaces 32, for output onto a line interface 31. This might be done at an ingress node 301 or at an intermediate node 303.

Both the interval between packets and the duration of packets is downscaled in the time-domain with the same factor as the relation between the bitrates of the line-interfaces 30, 31 and the client add/drop interfaces 32. When aggregating GST packets in queues, information about the size of gaps between the arriving GST packets is stored.

PDV is avoided by aggregating and de-aggregating GST packets into containers. Information on the utilization of each container is transferred, along with the GST packets of the container. When aggregating GST packets, a Container Control Packet (CCP) is created and sent with each container. This marks the start of each container but is also used to transfer the container utilization information. The Container Control Packet may also be used for other purposes, which are described in more detail below.

A container can carry GST packet data and also gaps. Gaps may be filled with a special value, such as one or more "gap bytes", or they may simply be empty, with the size of the gap being communicated by a time interval between the end of one GST packet and the beginning of the next GST packet, within a container The ingress node 301 or an intermediate node 310 schedules GST packets in containers, each of which has a corresponding Container Control Packet. GST containers are scheduled in GST container cycles. Each GST container cycle always starts with a Master Control Packet (MCP) which enables a global synchronization of the nodes 301, 310, 302. The function and content of the Master Control Packet and Container Control Packets are described below.

Figure 4:
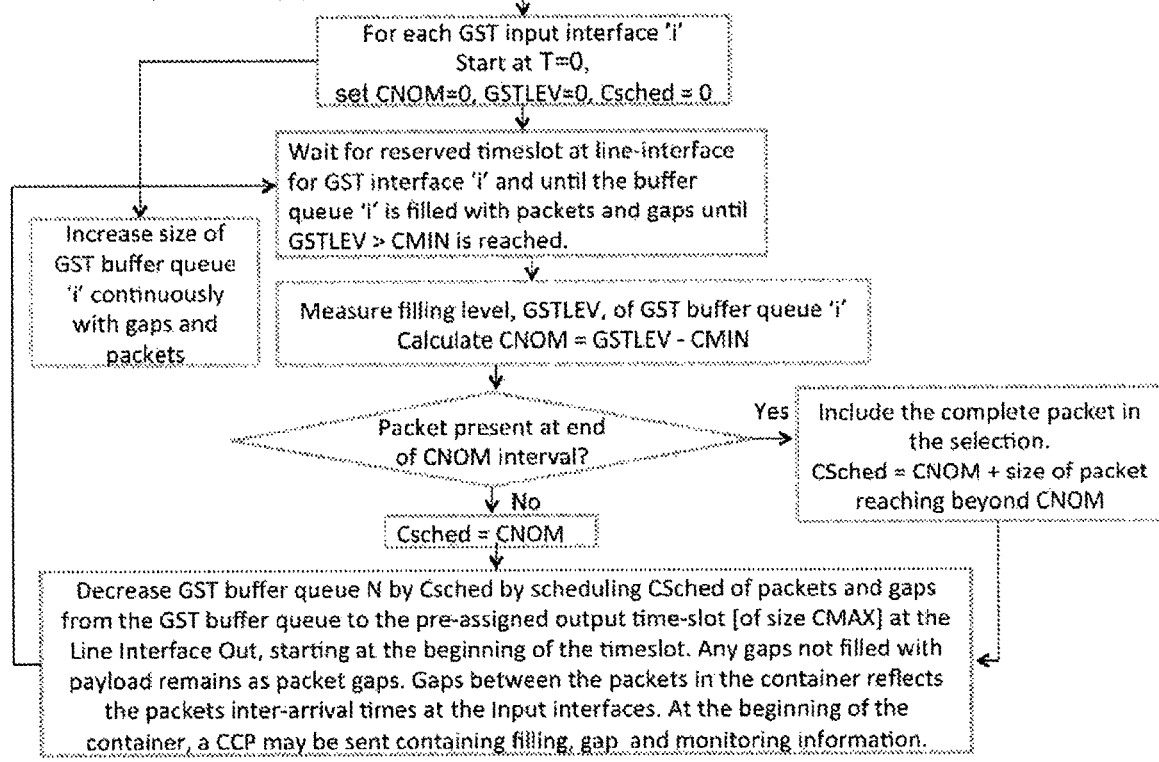
FIG. 4 is a flow chart showing a scheduling algorithm.

FIG. 4 is a flow diagram of the aggregation mechanism. The aggregation mechanism works by aggregating packets from multiple client add/drop interfaces 32 into respective time periods on a higher data-rate output line. All packets aggregated within a particular time period are then scheduled at the line side (i.e., the output interface 31) within a fixed interval of length CMAX. CMAX therefore determines the container size and will usually be set to equal S×GSTMTU, where S is an integer number larger or equal to two, and GSTMTU is the maximum allowable packet length (Maximum Transmission Unit) for GST packets on the network. Thus the length of each container is a fixed constant. A minimum of 2×GSTMTU for the container length ensures there is an overcapacity of at least one MTU, which means it is always possible to include a packet that falls on the edge of the initial sampling interval. This prevents packet fragmentation. The aggregation mechanism ensure the container will always include the complete packet when a packet spans the edge of the initial sampling interval.

Each GST interface on a node 301, 310, has a respective GST first-in-first-out (FIFO) buffer queue. The buffer can contain bytes from data packets and can also contain gap bytes representing interpacket spacing, or may have an associated list containing information about interpacket spacing between each of the GST packets. If the node receives a stream with specific "gap bytes", these may be included in the buffer; if the network sends information about the interpacket spacing separately in e.g. a control packet, then the node may generate internal gap bytes at an appropriate rate and insert these into the buffer or at a client output, whenever there are gaps between incoming GST packets.

Each GST queue has a minimum filling level, CMIN. Typically CMIN will be equal to or larger than one GST MTU. This ensures that, when starting to schedule from the buffer to a container on the line side, it is always possible to schedule a complete packet of size MTU, so as to avoid fragmentation of packets, which is not permitted. While the scheduling of gaps can potentially be interrupted, the scheduling of a packet must proceed until the complete packet has been scheduled. Therefore, before starting the scheduling of a packet, the complete packet should already be in the buffer. So long as CMIN>GSTMTU, if the scheduling of a packet from the buffer starts when the buffer is at the minimum level CMIN, the complete packet is guaranteed to be present in the buffer and available for scheduling, even if the packet is of the maximum possible size allowed by the network (i.e., GSTMTU).

The instantaneous filling level of the GST queue is referred to as the variable GSTLEV. Both packets and gaps are continuously being aggregated in the GST queue. When the relevant timeslot for the line-interface arrives, the current filling level of the queue, GSTLEV, is measured. If GSTLEV is greater than or equal to CMIN, then a container can be scheduled. (When the node first starts up the interface, typically GSTLEV<CMIN.) If it is not, then an empty container is sent, and the node tries again at the next timeslot.

The node calculates a nominal filling level, CNOM, of the container as CNOM=GSTLEV−CMIN.

If the oldest CNOM bytes in the GST buffer (which may define data and/or gaps) ends part way through a data packet, then this complete data packet is selected for scheduling. In this case, a value CSched is set equal to CNOM+the length of the portion of the data packet that extends beyond the first CNOM bytes of the buffer. Otherwise, CSched is set equal to CNOM. CSched then determines the resulting sampling interval—i.e. the length of the information that is included in the container (the filling level of the container), which may include both packets and gaps. The packet and gaps in the container are then scheduled, and the filing level, GSTLEV, of the FIFO buffer reduces by CSched. CSched will always be less than or equal to the fixed GST container length, CMAX.

Figure 5A:
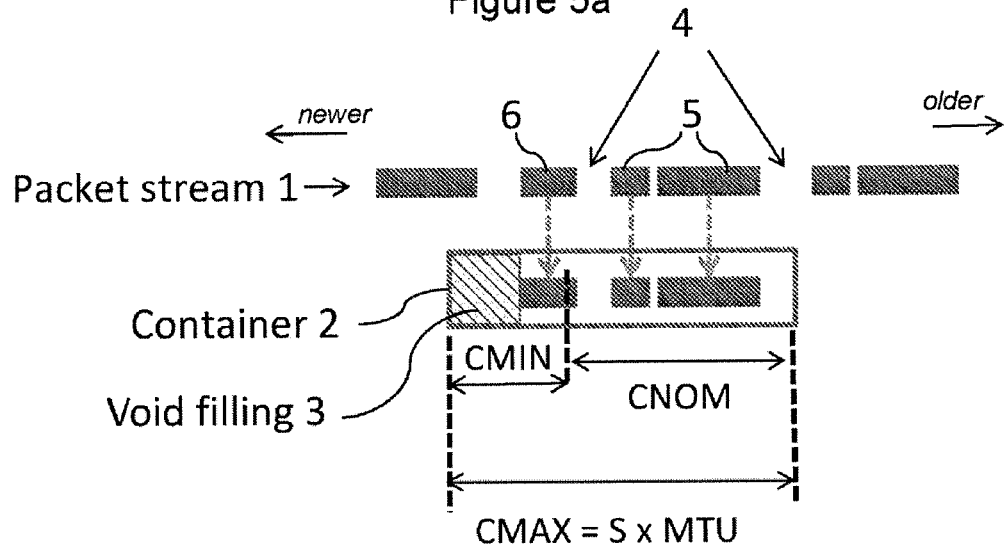
FIG. 5a is a schematic diagram of a first instance of packets being inserted into a container according to the scheduling algorithm.
Figure 5B:
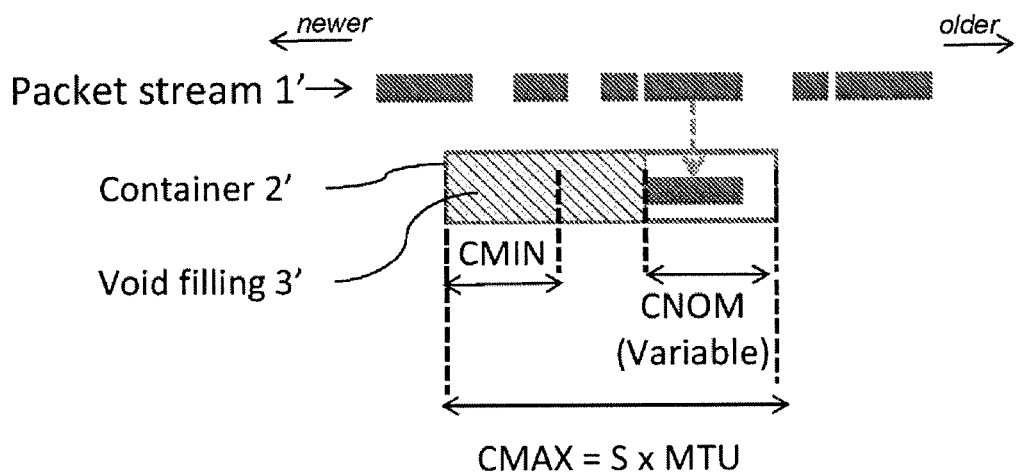
FIG. 5b is a schematic diagram of a second instance of packets being inserted into a container according to the scheduling algorithm.

FIGS. 5*a* and 5*b* show two different examples of the process of aggregating packets, from a packet stream 1, 1', into a container 2, 2'. The containers 2, 2' always have fixed lengths of S×MTU, for some fixed integer S, where MTU is the maximum transmission unit of the GST packet stream 1, 1'.

FIG. 5*a* shows some gaps 4 and two complete data packets 5 fitting into the container 2, up to the CNOM level (CNOM=GSTLEV−CMIN). However a third data packet 6 is partially within the oldest CNOM bytes, but also extends beyond this nominal filling level of the container. The filling level is therefore increased, according to the algorithm above, to accommodate the whole of the third data packet 6 in the container.

In general, CNOM is variable between a minimum of zero and a maximum that equals the size of the container minus CMIN. But in the example of FIG. 5*a*, it so happens that GSTLEV=S×MTU (the container size), and so CNOM is at its maximum possible value.

The container 2 is then scheduled to the line output once the assigned container interval (time slot) is available in a frame at the line output. The scheduled data packets 5, 6 and gaps 4 are then removed from the buffer. Because the container length is a fixed constant (CMAX) it will often be the case, as in the example in FIG. 5*a*, that the container 2 will be void 3 at the end of the container that is furthest from the earliest-received GST data packets and gaps, because typically CSched<CMAX. The node will typically insert gap bytes in this void 3. The receiving node should identify the void space 3, and discard it, when outputting the received data. It can do this by the transmitting node communicating the value of CSched to the receiving node (or CNOM, from which CSched can be deduced through analysis of the received container) and/or by directly communicating the size of the void 3.

In FIG. 5*b*, the queue filling level, GSTLEV, is less and so CNOM is smaller. Because, in this example, there is no data packet extending beyond CNOM bytes from the start (oldest end) of the container 2', there is no need to schedule any additional data bytes. The rest of the container is left void 3'. It may be filled with gap bytes, or correspond to silence, depending on the network protocol. In this case, the void 3' is larger than the CMIN minimum buffer level.

Containers are sent in a sequence: $C_0, C_1, \ldots, C_k, \ldots$ etc. The size of CNOM for a given container $C_k$ depends on the size of CSched for the previous container $C_{k-1}$. In other words, the CNOM and CSched parameters will vary, within bounds, according to the packet sizes and arrival patterns on the client inputs. CNOM is the expected sampling interval for a specific container, and is variable. The actual resulting sampling interval is given by the CSched parameter. The difference between CSched and CNOM arises due to the requirement always to include a GST packet that falls on the edge of the initial CNOM sampling interval.

When the container length CMAX equals S×GSTMTU for some integer, S, then the maximum value of CNOM will be (S−1)×GSTMTU. This is because one GSTMTU is reserved for including packets that fall over the edge of the CNOM interval. When a packet spans the edge of the sampling interval, and is included in a container $C_k$, the CNOM parameter for the next container, $C_{k+1}$, is reduced by an amount equal to that part of the packet that extended beyond CNOM for container $C_k$. Hence, on average, CSched=(S−1)×GSTMTU, but the actual value of CSched can fluctuate from container to container.

Because the system is asynchronous, packets are typically clocked in at the client interface of a node 301, 303 at a different frequency (bitrate) than the frequency (bitrate) at which the node outputs packets. (Note, however, that use of an asynchronous network is not essential, and other embodiments of the invention may be synchronous at the bit level—e.g., using SyncE.) This difference in frequencies is an additional factor that will impact the filling level, GSTLEV. The size of the CNOM parameter can therefore depend not only on packet-arrival pattern, but also on the frequency of the client that is connected to the node's client interface. CNOM therefore implicitly contains information about any relative frequency difference between the client interface and line interface.

In some embodiments, the node 303 sends the value of CNOM, for a particular packet container, to a downstream node 303, which uses the value to perform frequency compensation by calibrating the outgoing frequency of the downstream node's client interface to the incoming frequency of the transmitting node's client interface.

Using CNOM, a downstream node 303 will be able to distinguish an unfilled (void) part of the container (as shown in FIG. 5) from intentional packet gaps that represent interpacket spacing between GST data packets. The information in the CNOM parameter can thus be used to communicate the filling level of the container to a downstream node. The unfilled (void) part of the container equals CMAX minus CNOM minus any part of a data packet falling over the edge of the CNOM sampling interval.

If the filling level of each container is not communicated to the downstream node, the downstream node will not be able to identify and discard the voids in the containers and so may receive more gaps in the packet stream than it is able to clock out on its client interface. This may result in a buffer overrun on the downstream node.

As an alternative to transmitting CNOM (or CSched, or other equivalent data) for each container, in some embodiments a receiving node clocks the incoming packet stream, containing both packets and gaps, into a buffer and monitors a filling level of the buffer. If the filling level rises beyond a defined maximum limit, the receiving node may then skip all gaps when clocking data packets out from the buffer through its client output interface. This avoids buffer overrun, which might otherwise result in loss of data packets, but it may introduce some PDV, because some of the skipped gaps may arise from interpacket spacing, instead of container void filling.

When a GST container is received at the downstream node, the packet stream at the node's line-side input is de-aggregated through reconstructing the individual client packet streams, out of their corresponding containers.

Figure 6:
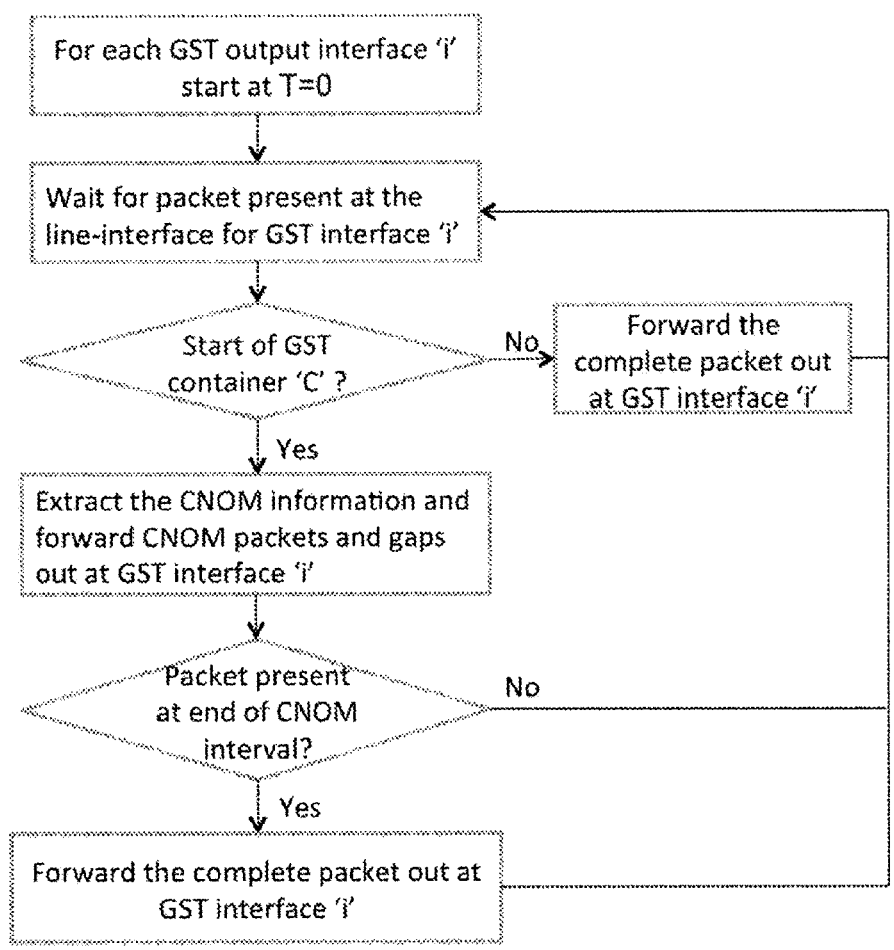
FIG. 6 is a flow chart showing how a receiving node can process a received container.

FIG. 6 is a flow chart for the de-aggregation process, where the value of CNOM for a container has been communicated to the node (e.g., encoded in a Container Control Packet). When the start of the container is identified, both packets and gaps are forwarded from the node's line input to the node's client output. The number of bytes being forwarded is defined by the CNOM parameter. If, after forwarding CNOM bytes, forwarding of a packet is still ongoing, the forwarding of the packet is finalized. This implies that the extra MTU overcapacity has been applied partly or fully during the container aggregation process and that CSched will have had a larger value than CNOM for that container.

In some embodiments, each container starts with a Container Control Packet (CCP). The Container Control Packet and its contents are used by the downstream node, when receiving a container. The sending node may encode any of the following parameters in the Container Control Packet of a container: CNOM, CSched, the number of data packets in the container, the number of packet bytes in the container, the number gap bytes in the container, a transmission time stamp, the number of bits in the container, etc. The Container Control Packet may also container other information such as monitoring information which the receiving node can use to measure latency, or packet loss, or byte loss, or bit loss, etc.

The receiving node can extract CNOM, or CSched, and use this to find the nominal length and the utilisation of the container. The start of the Container Control Packet may indicate the start of the container to the receiving node (which is not synchronized to the transmitting node).

Because the lengths of the data packets can vary, and a set of received data packets need to be fitted into a fixed length container it is not, in general, possible to achieve 100% utilization. As already described, each container is equipped with an overcapacity length corresponding to at least one GSTMTU, meaning that the minimum container length is 2×GSTMTU. Typically an additional overhead length is added to this, as a guard band, to allow for some deviation in timing accuracy in practical implementations.

The minimum container length also depends on the number of client interfaces being aggregated. For example, when aggregating five interfaces of 1 Gb/s into one 10 Gb/s line, the minimum container length of two GSTMTU will allow for aggregation of one GSTMTU packet and additionally allow for the inclusion of any packet falling at the edge of the sampling interval (CNOM). This creates an overhead capacity of 100% since the total maximum traffic from the five interfaces is only 5 Gb/s. Hence, when aggregating traffic from more than five such interfaces, the overhead traffic needs to be lowered. This is achieved by using larger container, which allows the average sampling interval (CNOM) to be larger than a single MTU.

The overhead is given by

Overhead=1/(Average sampling interval in number of GSTMTU (CNOM)+GSTMTU).

The bandwidth utilization on the line-side is

BW utilization=1−Overhead.

This implies that if, for example, the average sampling interval were increased to two GSTMTU, the overhead would be reduced to ⅓ and the bandwidth utilization on the line side is increased to ⅔.

So, if aggregating 1 Gb/s client interfaces onto a 10 Gb/s line interface, this implies that 2/3*10 Gb/s=20/3 Gb/s can be aggregated, corresponding to a maximum of six client interfaces.

The relation between the minimum required average sampling interval, "CNOM" defined as an integer number of GSTMTU, and the number of interfaces available for aggregation is given as:

Number of client ports=CNOM*line-rate/((CNOM+ 1)*client interface rate)

For a system with a 10 Gb/s line rate and a 1 Gb/s client rate, this implies that:
CNOM=1 requires 5 ports
CNOM=2 requires 6 ports
CNOM=3 requires 7 ports
CNOM=4 requires 8 ports Since the length of the container, in bytes, is determined by the number of GSTMTUs and the size of the GSTMTU, it may be desirable to have different GSTMTU sizes for the different containers in a frame. In other words, the GSTMTU length may be set differently for different client interfaces.

If, for example, a first client-interface serves a stream of packets with standard Ethernet lengths, the GSTMTU may be set to 1518 Bytes. If a second interface serves a stream of packets where the maximum size of the packets are 200 Bytes, and arrive at a lower line rate than the first client interface, the GSTMTU for the container serving this interface may be set to 200 Bytes. As a result, the length of this container in bytes may be shorter. This again will result in a shorter cycle and a lower delay.

Furthermore, a client interface may be given a higher capacity (bitrate) by allowing it to fill two or more containers within the same cycle. For example, the 200 Byte interface (GSTMTU=200 Bytes) could be allocated multiple containers per cycle, thereby allowing the interface to have the same or even higher bitrate than the interface serving the 1518-Byte GSTMTU stream.

The buffering time required at the client-side depends on the length of the containers, the number of containers, "Ccy", in a cycle, and any possible additional data in a Reserved Field (described below) in the cycle. A container will always be filled up as much as possible, up to the reserve level, from the client interface before being scheduled. The containers may be filled with packets and gaps, or packet gaps only. Each client interface has a predetermined number of containers scheduled in each GST cycle. When packets in a container are aggregated in a buffer, there is a fixed store-and-forward delay corresponding to the duration of one GSTMTU—i.e. the store and forward delay is independent of the packet length. Hence, the Buffering Time (Bt) for data in any given container corresponds to the duration of the GST container cycle plus the duration of one GSTMTU.

In the aggregation techniques described here, each packet stream, which typically may be associated with a respective client interface input, is associated with a respective GST container in a GST container cycle. The GST container cycle always starts with a Master Control Packet (MCP) which enables global synchronization of the nodes. One or more master nodes in the network generate the Master Control Packet packets. Whenever a slave node in the network is configured to schedule a GST stream of packets it is required that the node schedule these packets within a container with a corresponding Container Control Packet. The time the Container Control Packet along with the rest of the container is scheduled is given as a fixed number of bytes after the reception of the Master Control Packet (this fixed number may be preconfigured in hardware or software, or may be communicated through a separate management system). Hence, the Master Control Packet works as a synchronization packet for the slave nodes for the scheduling of Container Control Packets and containers. The different containers in the GST container cycle are scheduled in different time-slots, i.e. at different number of bytes after the reception of the Master Control Packet.

Figure 7:
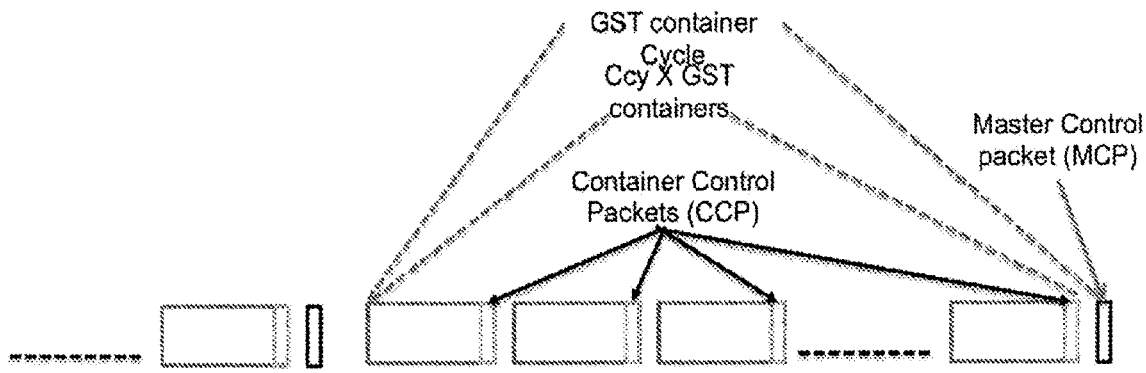
FIG. 7 is a schematic diagram of a stream of containers and associated control packets.

FIG. 7 shows a GST container cycle, with its corresponding Master Control Packet, as well as exemplary containers and their associated Container Control Packets. Time runs from right to left in the figure—i.e., the Master Control Packet is sent first.

The length of a GST container cycle may, in some embodiments, be longer than the minimum length required for the GST containers and the corresponding Container Control Packet and Master Control Packets. By extending the length beyond the required minimum length, a field in each container can be reserved for traffic that has lower demands for latency guarantees than the GST traffic. This is referred to as a Reserved Field (RF). This traffic may be Statistical Multiplexed (SM) traffic that utilises statistical multiplexing for higher exploitation of the available bandwidth, as described in the applicant's earlier patent application WO 2012/104623. The available bandwidth for the SM traffic will then depend on the length of the Reserved Field relative to the total GST container cycle length.

Figure 8:
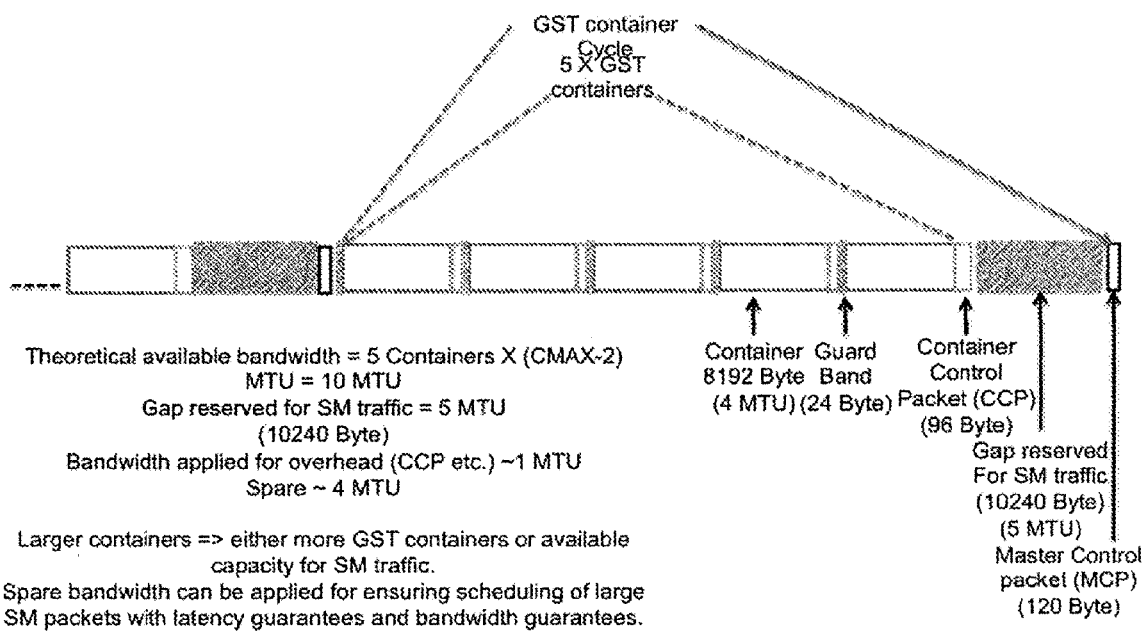
FIG. 8 is a schematic diagram of a stream of containers with reserved fields for inserting statistically-multiplexed traffic into the stream.

FIG. 8 shows an example implementation of this idea, in which a GST container cycle consists of five GST containers (Ccy=5×GSTMTU), each of length four GSTMTU (i.e., S=4), plus a Reserved Field (RF) of five GSTMTU for SM traffic.

FIG. 9 shows an embodiment in which two edge nodes 901, 902 generate separate Master Control Packets for opposite transmission directions. Alternatively, two edge nodes 901, 902 may be synchronized so that only one of the edge nodes 901 works as a master, while the second edge node 902 retransmits each Master Control Packet received from the first node 901 in the opposite direction. The slave nodes 903 use the Master Control Packets for synchronizing scheduling of GST containers and its corresponding Container Control Packets.

The selection of the master node may be performed by a protocol for bidirectional links as follows. Each node monitors those of its line inputs that may receive Master Control Packets (typically all inputs capable of receiving GST containers). If one of the line-inputs does not receive a Master Control Packet within a specified time interval or byte interval, the node will take the role as a master, generating Master Control Packets at one or more of the other line-outputs of the node. Hence, as illustrated in FIG. 9, there may be two masters 901, 902 in the system, one for each direction. With the described algorithm, the Master Control Packets for the two directions are not synchronized. In an alternative implementation this may be achieved by, e.g., first manually configuring one of the edge nodes 901, 902 as the master. Then, all other nodes are slave nodes. Any slave node not receiving Master Control Packet at one or more of its line-inputs, while still receiving Master Control Packets at one or more other of its line-inputs, may then regenerate Master Control Packets synchronously based on the incoming Master Control Packets. The regenerated Master Control Packets are then scheduled on the bidirectional line-outputs where the corresponding line-inputs Master Control Packets are missing.

FIG. 10 shows some data fields that may be present in a Master Control Packet. In this example, the Master Control Packet is used for multiple applications, including: synchronization of the container scheduling; Ethernet Ring Protection switching ("ERP control" data field) for communicating control information where the Master Control Packet is applied for ring-protection purposes; distributing information about time ("Time of day" data field); a time-stamp representing time and/or frequency at the node generating the Master Control Packet; and a sequence number indicating a unique number in a sequence of GST cycles. The start of the Master Control Packet is used for indicating the start of a GST container cycle.

FIG. 11 illustrates the content of the Master Control Packet when used for Ethernet. The Master Control Packet has 95 bytes of data and a gap of 48 bytes which can be used for various purposes, as shown.

FIG. 12 shows an example Container Control Packet (Container Control Packet), which marks the start of each container, and can be used for synchronization purposes in some embodiments.

A receiving node can use the arrival of the Container Control Packet to determine when the container and its content should be selected. The Master Control Packet indicates the start of a GST container cycle, and so may also be used for selecting containers if the container occurs a fixed number of bytes after the Master Control Packet. However, using the Container Control Packet for synchronization purposes enables containers from the individual nodes to arrive with some timing inaccuracy, within a time-slot larger than the container itself (i.e. a variable number of bytes after the Master Control Packet). There are preferably guard-bands in front of, and after, the container. When the Container Control Packet start is used for container synchronization, finding the exact start of the container becomes less influenced by any PDV that may occur between the Master Control Packet and the start of a container. After a container has been selected, the content may be forwarded to one of the node's client output interfaces.

The Container Control Packet may contain a number of data fields, as shown in FIG. 12. These include: a timestamp for communicating the frequency of the upstream node that generated the Container Control Packet and its corresponding GST container; a "free running counter timestamp" field; information about the length of the content (i.e., the filling level of packets and gaps) of the current and/or previous container, referred to here as "CSched (Actual filling)"; a "CNOM (nominal length)" field from which the receiving node can determine how much of the container is void. The client timestamp field can contain information regarding the frequency of the signal received at a client interface of the upstream node, carrying the packet stream that is to be scheduled in the GST container. The "packet statistics" data field is for OAM (Operations, Administration, and Maintenance) purposes and can contain information about how many packets are scheduled within this container and/or a packet counter indicating the total number of packets so far that have been scheduled in this container. The "byte statistics" data field is for OAM purposes and can contain information about how many bytes are scheduled within this container and/or a byte counter indicating the total number of bytes so far that have been scheduled in this container. The "time of day" data field can contain information regarding a local or global time of day. This information may be useful for time-of-day synchronization in the network. Furthermore, there may be gaps in the Container Control Packet reserved for future applications.

FIG. 13 shows an example Container Control Packet payload where some of the data fields of the packet shown in FIG. 12 are not present. These fields may not be part of the Container Control Packet or may be left empty for future use and implementations.

FIG. 14 shows an example of a Container Control Packet suitable for use in Ethernet systems. The packet has a payload content of 64 bytes, and 32 bytes reserved for the Ethernet specific information such as: required gaps between packets, Frame Check Sequence (FCS), etc.

When a container travels through a network, it may experience packet delay variation (PDV). Sources of PDV can typically be from packet switches along the container's path. Also, even though the methods described above allow for zero PDV in the scheduler of a packet switch, in the real world it may be necessary to use components within the packet switch design that introduce PDV. Examples of such components include serialisers, deserialisers, clock-domain converters, and FPGA transceivers. Typically, the PDV added by packet switches may be large—in the order of the duration of one or more packet lengths—due to factors such as contention and buffering along the network path. PDV added as a result of imperfect components in an implementation typically adds smaller amounts of PDV—in the order of a few bytes or less.

The deviation between the number of gap bytes in the container when it is transmitted, and the number of gap bytes when it is received by the downstream node, is a measure of the amount of PDV added along the network path. If this deviation can be found, the PDV can be compensated for by adding or removing gap bytes, bringing the amount of gap bytes in the container back to its original. Various methods of doing this are possible, in different embodiments of a receiving node.

In some embodiments, when gap bytes are added or removed, the adding or removal of the bytes may be performed by searching from the beginning of the container for gap bytes between packets, which can potentially be removed. Depending on the protocol being used, there may be a requirement of a minimum number of gap bytes between packets, which prevents gap bytes from being removed between packets whenever the number of gap bytes between these packets already equals the minimum value.

In some embodiments, as an alternative to searching from the beginning of the container for gap bytes, a node may search from the end of the container. Alternatively, gap bytes may be removed randomly within the container. A preferred alternative with respect to PDV compensation may be to distribute the removal or addition of gaps uniformly between packets in the container, as far as is possible. This avoids adding or removing a large chunk of gap bytes between two specific packets, which could otherwise reduce the effectiveness of the PDV compensation. Other embodiments search through the container for gaps between the data packets in the container before deciding where to remove or add gap bytes. Adding or removing gap bytes may then be performed with the aim of restoring the gap pattern to a pattern that was present when the container was transmitted. In some cases, e.g. a fixed bitrate stream, there may be a fixed number of gaps between the packets. If the pattern is known in advance at the receive side, it may be reconstructed using this method.

In some embodiments, the locations at which gap bytes are added or removed are distributed based on the lengths of the data packets and the lengths of the interpacket gaps in the container. This can help to minimise PDV for data packets within the container. In general, it is likely that a large packet will be more delayed than a small packet. For example, packet switches often have a store and forward delay, in which the delay for each packet increases with packet length. Hence, if gap bytes need to be removed the node may advantageously remove more gap bytes in front of a longer packet than in front of a shorter packet. The optimum distribution of where to remove or add gap bytes, according to the length of the packets, may be determined experimentally or through simulation models, for any particular context. The node is then configured to determine the packet lengths in a received container, and to use distribution rules to determine where to insert or remove gap bytes.

In some embodiments, the receiving node determines the filling level of the container (e.g. by receiving a CSched or CNOM parameter from the upstream node), and uses this information to compensate for PDV. After receiving a Container Control Packet, the node counts the number of bytes both in packets and in gaps. On reaching a number equal to CSched, the node identifies the end of the container's content. However, if a packet is still being clocked in (because PDV has "stretched" the filling level of the container), the whole packet should be counted as part of the current container content being received. Any difference between the received CSched value and the counted total amount of packets and gaps indicates the number of gaps that should be removed in order to return the container to its original size. By removing this number of gap bytes as the node clocks the packets and gaps out of its client interface (if it is an egress node), or a line interface (if it is an intermediate node), the container is brought back to its original size. As a result, the PDV that was added along the network path is reduced.

This mechanism is not able to compensate for PDV as a result of the number of gap bytes in the container being reduced along the network path. It is also not able to compensate for the situation where the network has introduced so many additional gap bytes, due to PDV, that one or more complete packets, originally in the container, falls outside the CSched length for the container content at the receiver side.

In some embodiments, a receiving node compensates for PDV by continuously monitoring the filling level of a buffer in the node, containing both packets and gaps. PDV may be compensated by comparing the actual filling level with an expected filling level. The expected filling level may be derived from information sent in the Container Control Packet—e.g., the CNOM and CSched parameters. If the actual filling of the buffer is found to be larger than the expected filling, gaps may be removed by one of the methods described herein. If the actual filling of the buffer is found to be smaller than the expected filling, gaps may be added using one of the methods described herein.

If a container is exposed to a large PDV, the beginning and end of the container may still be identified at the receiver side by the container's Container Control Packet (container beginning), and the following container's Container Control Packet (container end). If the Container Control Packets are transmitted with a fixed frequency, the receiver node may be aware of this frequency. The receiving node may use this information for compacting a container back to its original size by removing gap bytes, or expanding a container back to its original size by adding gap bytes. This compensation method requires a buffering at the receiver side where the buffering time is sufficiently large to buffer an entire incoming container that has been spread out in time. The peak PDV of the system defines the minimum required buffering time and, hence, the amount of added fixed delay this buffering introduces.

Figure 15:
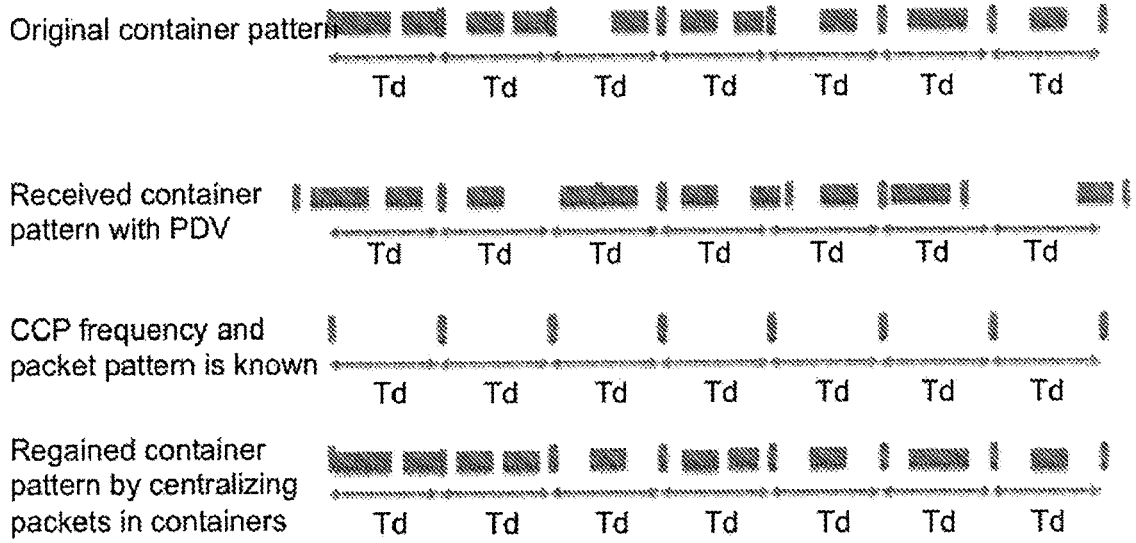
FIG. 15 is a schematic diagram showing an example of how a receiving node adjusts the positions of packets in received containers.

FIG. 15 illustrates the principle of adjusting a received container so as to being the container closer to its original form when it left an upstream node.

The top line shows an exemplary sequence of seven consecutive containers, as they are transmitted by an upstream node, each containing one or two data packets (shown as solid rectangles) and some gaps (shown as blank space). Each container starts with a Container Control Packet (CCP), shown as a taller, thin rectangle. The containers are all of equal length, so the CCPs are transmitted at regular time intervals, "Td".

The second line shows the containers as they might be received by a downstream node. They have experienced PDV during transit between the two nodes. It can be assumed that the order of the containers and data packets remains unchanged, but that the intervals between the Container Control Packets are no longer regular, and the positions of the data packets relative to the Container Control Packets has also changed.

The downstream node uses its knowledge of the time intervals "Td" to shift the received Container Control Packets in time so that they regain a regular frequency. Where a container contains only one data packet, the downstream node centres this in the container. Where a container contains multiple packets, these are redistributed within the adjusted container, by determining how many gap bytes need to be added or removed, and then adjusting the gaps between the packets so that there are an equal number of gaps in total between each packet, and between the start of the container and the start of the first packet, and between the end of the last packet and the end of the container. I.e., the gap between each packet=total number of gaps in the container/(number of packets+1).

As can be seen from the example in FIG. 15, this method does not guarantee perfect restoration of the original pattern of packets and gaps. I.e., PDV is reduced, but not necessarily fully removed.

If the PDV has been partially mitigated using the period between Container Control Packets, the length and duration of each container are back to their original values. Some embodiments may then attempt to reduce PDV further, by using container filling information (e.g., CSched or CNOM) to reposition one or more data packets within the container, as described above.

The two worst-case PDV situations that can occur within a container are: (i) when the container contains only a single packet, which occurs at the beginning of the container at the transmit side, but because of PDV in the network has been moved to the end of the container at the receive side; and (ii) when the container contains only a single packet, which occurs at the end of the container at the transmit side, but because of PDV has been moved to the start of the container at the receive side. To help in these situations, in some embodiments the transmitting node sends information to the receiving node about where the first packet is positioned in each container. The receiving node can use this information to restore the first packet to the indicated position, thereby fully compensating the PDV of this packet in these two worst-case situations. The positioning information may be transferred in the Container Control Packet—e.g., as a number of gap bytes that should be present between the end of the Container Control Packet and the start of the first packet in the container. When receiving the container, an appropriate number of gap bytes may then be inserted or removed immediately before the first packet when it is clocked out on the client interface so as to match the received positioning information.

PDV that may occur between packets in the container cannot, in general, be fully compensated using information only about the first packet. If information regarding the position of all the packets is available, the PDV within a container can be fully compensated. Some nodes may send such information, and some nodes may use it to compensate for PDV. In this case, it may not be necessary to transmit any gaps at all; all the data packets from one container could be transmitted together as a burst. However, sending position information for every data packet may require a large amount of information to be included in the Container Control Packet because there may be a large number of short packets within a container and a correspondingly high number of gaps between the packets. This may be undesirable due to the added overhead this causes. A reasonable compromise, used in some embodiments, is for the transmitting node to send position information for the first and last packet in each container, but not for intermediate packets. A receiving node can adjust the positions of the first and last packets so as to remove all PDV, and then distribute intermediate packets using one of the approaches already described.

The number of packets and the number of gap bytes in the container may be communicated by the transmit side, in the Container Control Packet, either directly or implicitly. At the receiver side, if the number of packets or the number of gap bytes does not match the received numbers within the expected period of the container, one or more packets are delayed. The node has a receive buffer with the ability to store more data than is contained in one container, and uses this for storing a container that has been spread out in time when passing through the network path. The number of packets in the container is determined from the Container Control Packet at the receiver side. The node then buffers all packets and gaps until the number of packets given in the Container Control Packet is reached. The end of the container content is given by the end of the last packet, and the node then adjusts the number of gap bytes in the container back to its original size (as communicated by the transmitting node) using any of the methods described herein for adding or removing gaps.

Ethernet is an asynchronous system based on individual unsynchronized clocks at the individual nodes. When filling containers with packets and gaps at a first node and then transmitting the containers to a second node, the second node typically runs at a higher or lower frequency than the first node. When transmitting packets, the node uses its internal clock when clocking out the packets. When receiving packets, the receiving node synchronises its receiving interface with the incoming signal, and clocks packets into the node's buffer according to the frequency of the incoming signal.

If the receiving node is running at a lower frequency than the transmitting node, the receiving node will therefore transmit packets and gaps to a downstream node at a lower frequency than it receives them from the transmitting node. If this frequency deviation is not compensated for, and the node aims to preserve the number of gaps when transmitting the packets, the receiving node's buffer will gradually be filled up with packets and gaps until it overflows. To avoid buffer overflow, some embodiments remove gaps according to any of the methods described herein.

If the receiving node is running at a higher frequency than the transmitting node, it may add gaps at an appropriate rate in order to improve synchronization, i.e. transmit frequency information, across the network.

Figure 16:
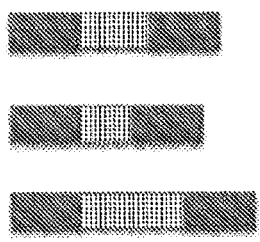
FIG. 16 is a schematic diagram of gaps being removed and added to correct for clock frequency errors.

FIG. 16 shows examples of two packets (solid shading) with a packet-gap between them (vertically-striped shading). In the top row, the two packets are being received by a receiving Ethernet node, with some gap bytes between them. The middle row illustrates a situation in which the receiving node has removed some gap bytes because the output frequency of the receiving node, $f\_o$, is less than the incoming frequency, $f\_in$. The bottom row illustrates a situation in which the receiving node has added some gap bytes because the output frequency of the receiving node, $f\_o$, is greater than the incoming frequency, $f\_in$. This approach is not, of course, limited to use in Ethernet networks.

In order to find the frequency deviation, the transmitting node may put a time-stamp in each of the Container Control Packets. At the receiver side, a free-running clock generating similar timing information is compared with the time stamps of the received packets. Any frequency deviation can be calculated from the results of the comparison.

However, if there is PDV present in the packet stream, there will be an increased or reduced number of gaps between packets compared to the original packet stream. This can cause the time-stamped packets to arrive earlier or later than would be the case if there were no PDV. Hence, the accuracy of the frequency characterization is impacted by PDV.

Some nodes may use the following method to compensate for frequency deviations in a system where PDV is present:
(i) Container Control Packets containing timestamps are generated at a remote node, where the timestamps are count values taken from a counter that counts clock cycles at the remote node;
(ii) when the Container Control Packets are received at a local node, the timestamps are compared with a counter running at the local node, counting the clock cycles at the local node;
(iii) these comparisons are used to estimate the difference between the frequency of the local node and the frequency of the remote node;
(iv) the PDV is measured experimentally, or is estimated using analytical methods;
(v) if the magnitude of the measured frequency deviation is below a first, lower threshold, then PDV is corrected for using any appropriate method described above, but no frequency correction is performed, so as to avoid initiating frequency correction where the frequency measurement may be inaccurate because of moderate amounts of PDV;
(vi) if the magnitude of the measured frequency deviation is above the first, lower threshold but below a second, high threshold, frequency correction is performed; (vii) if the magnitude of the measured frequency deviation is above the second, upper threshold, no frequency correction is initiated to avoid initiating frequency correction where the frequency measurement may be inaccurate because of very large PDV (e.g. caused by a temporary fault condition at an intermediate network element);
(viii) if the frequency of the remote node exceeds the frequency of the local node by more than the second, upper threshold (e.g., a fault condition), the node triggers the streaming of received packets on the output with all gaps between packets removed, in order to reduce the risk of the local node's buffer overflowing; the synchronization mechanism is then restarted.

It will be appreciated by those skilled in the art that the invention has been illustrated by describing one or more specific embodiments thereof, but is not limited to these embodiments; many variations and modifications are possible, within the scope of the accompanying claims.

In particular, the containers need not necessarily all be transmitted with a fixed, constant length, but may have lengths that vary between the client interfaces, or that vary within a data stream associated with one client interface. Although certain embodiments have been described with reference to asynchronous networks, some embodiments may be implemented on networks that are synchronized. Some embodiments can be used on a network that is synchronized at the bit level but not at the packet level, such as Synchronous Ethernet (SyncE). Although certain embodiments have been described as aggregating multiple lower line-rate connections onto one higher line-rate connection, and vice versa, it will be appreciated that this is not essential, and the same mechanisms may be used in a node having an equal input and output line rate—e.g., acting as a regenerator.

The invention claimed is:

1. An apparatus for use in a packet-based communication system, the apparatus comprising:
 a first input;
 a second input;
 an output; and
 electronic circuitry and/or a processor and a memory storing software for execution by the processor,
 wherein the apparatus is configured to:
 receive a first stream of data packets, having a first maximum packet length, and having an inter-packet spacing, at the first input at a first line rate;
 receive a second stream of data packets, having a second maximum packet length, greater than the first maximum packet length, and having an inter-packet spacing, at the second input at a second line rate;
 send the first stream of data packets from the output, at a third line rate, higher than the first and second line rates, in a first sequence of containers, wherein the containers of the first sequence have a first uniform transmission length, and wherein the positions of the data packets of the first stream of data packets within the containers of the first sequence of containers depend on the inter-packet spacing of the first stream of data packets; and
 send the second stream of data packets from the output, at the third line rate, in a second sequence of containers, interspersed between the first sequence of containers, wherein the containers of the second sequence have a second uniform transmission length, greater than the first uniform transmission length, and wherein the positions of the data packets of the second stream of data packets within the containers depend on the inter-packet spacing of the second stream of data packets.

2. The apparatus of claim 1, wherein the second line rate is higher than the first line rate.

3. The apparatus of claim 1, wherein a ratio of the second line rate to the first line rate is equal to a ratio of the second maximum packet length to the first maximum packet length.

4. The apparatus of claim 1, wherein the first and second sequences of containers are sent in a cycle with a first number of containers from the first sequence, and a second number of containers from the second sequence, being scheduled in the cycle, wherein the first number is different from the second number.

5. A receiving apparatus, comprising:
 an input;
 an output; and
 electronic circuitry and/or a processor and a memory storing software for execution by the processor, wherein the apparatus is configured to:
 receive a sequence of containers at said input, from a transmitting apparatus, wherein each container contains one or more data packets, and has a respective received aggregate length of data and inter-packet spacing;
 adjust, where required, the inter-packet spacing within each container so that the received aggregate length of the data packets and inter-packet spacing within the received container corresponds to the aggregate length of the data packets and inter-packet spacing that was contained within the container when it was transmitted by the transmitting apparatus, wherein said adjusting comprises determining the number of inter-packet gaps in the container and using this number to identify one or more positions in the container at which to increase or reduce the inter-packet spacing; and
 send, from said output, data packets from the received containers at times that depend on the adjusted inter-packet spacing.

6. The packet-based communication system of claim 5, wherein the receiving apparatus is arranged to determine the number of inter-packet gaps from data transmitted to the receiving apparatus by the transmitting apparatus or to count the number of inter-packet gaps in each received container.

7. The packet-based communication system of claim 5, wherein the receiving apparatus is arranged to determine a total amount of inter-packet spacing to be added to or removed from a container.

8. The packet-based communication system of claim 7, wherein the receiving apparatus is arranged to add or remove the total amount by adding or removing a respective amount from each gap in the container, wherein the respective amounts differ from each other by at most one predetermined minimum unit of addition or removal, which may be one bit or one byte, and wherein the respective amounts sum to the total amount.

9. The packet-based communication system of claim 7, wherein the receiving apparatus is arranged to add or remove the total amount by adding or removing respective amounts, summing to the total amount, from a set of gaps in the container, wherein gaps in the set of gaps are selected according to a random or pseudo-random process.

10. The packet-based communication system of claim 5, wherein the receiving apparatus is configured, when adjusting the inter-packet spacing within a container in order to shorten the container, to determine lengths of every data packet in the container and to use said lengths when identifying one or more positions in the container at which to reduce the inter-packet spacing by using the lengths in an algorithm that identifies the one or more positions such that an expected reduction to an inter-packet space immediately preceding a data packet having a first length is greater than an expected reduction to an inter-packet space immediately preceding a data packet having a second, shorter length.

11. A packet-based communication system comprising a transmitting apparatus, a receiving apparatus and electronic circuitry and/or a processor and a memory storing software for execution by the processor, wherein the transmitting apparatus is configured to:
  receive data packets, having an inter-packet spacing;
  send the data packets to the receiving apparatus, over a communications link, in a sequence of containers having respective transmission lengths, wherein the positions of the data packets within the containers depend on the inter-packet spacing of the data packets, wherein a start of each container is marked by a respective container-start packet generated by the transmitting apparatus, and wherein the container-start packets are transmitted at regular intervals, and wherein the receiving apparatus is configured to:
  receive the sequence of containers, each container having a received length which may differ from the transmission length of that container;
  use intervals between the received container-start packets to adjust the length of any of the received containers whose received length does not correspond to the transmission length of the container, by adjusting the inter-packet spacing within each such container, so that the received length of each container corresponds to the transmission length of that container; and
  output the data packets from the received containers at times that depend on the adjusted inter-packet spacing.

12. The packet-based communication system of claim 11, wherein the regular intervals at which the container-start packets are transmitted are equal to the transmission lengths of the containers such that every container has a common transmission length.

13. The packet-based communication system of claim 11, wherein the receiving apparatus is arranged to adjust the lengths of the received containers so that the intervals between the received container-start packets, after adjustment, equal the regular intervals of the transmission.

14. The packet-based communication system of claim 11, wherein the transmitting apparatus is configured to communicate to the receiving apparatus, for each container, an aggregate length of the received data packets and inter-packet spacing contained within the container, and the receiving apparatus is configured to check each adjusted container to determine whether the adjusted container contains a data packet that extends beyond the communicated aggregate length from a start of the container and, if so, to reduce the inter-packet spacing within the container so as to move that data packet nearer to the start of the container such that it no longer extends beyond the communicated aggregate length from the start of the container.

15. The packet-based communication system of claim 11, wherein the transmitting apparatus is configured to send time stamps to the receiving apparatus.

16. The packet-based communication system of claim 15, wherein the receiving apparatus is arranged to use the time stamps to perform a frequency compensation operation.

17. The packet-based communication system of claim 16, wherein the frequency compensation operation comprises adding or removing gaps from inter-packet spacing before outputting the data packets.

18. The packet-based communication system of claim 15, wherein the receiving apparatus is arranged to apply a filtering operation to received time stamps when performing the frequency compensation operation.

19. The packet-based communication system of claim 11, wherein the receiving apparatus is configured to output the data packets with all inter-packet spacing removed if a fault condition is met.

20. The packet-based communication system of claim 11, wherein the transmitting apparatus is arranged to output containers of different size.

* * * * *